United States Patent
Yang et al.

(10) Patent No.: US 11,579,899 B2
(45) Date of Patent: Feb. 14, 2023

(54) METHOD AND DEVICE FOR DYNAMICALLY MANAGING KERNEL NODE

(71) Applicant: HUAWEI TECHNOLOGIES CO., LTD., Guangdong (CN)

(72) Inventors: Qibin Yang, Hangzhou (CN); Fei Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 431 days.

(21) Appl. No.: 16/820,964

(22) Filed: Mar. 17, 2020

(65) Prior Publication Data

US 2020/0218816 A1 Jul. 9, 2020

Related U.S. Application Data

(63) Continuation of application No. PCT/CN2018/106954, filed on Sep. 21, 2018.

(30) Foreign Application Priority Data

Sep. 21, 2017 (CN) .......................... 201710856807.9

(51) Int. Cl.
G06F 21/62 (2013.01)
G06F 9/54 (2006.01)
(Continued)

(52) U.S. Cl.
CPC .......... *G06F 9/44521* (2013.01); *G06F 9/545* (2013.01)

(58) Field of Classification Search
None
See application file for complete search history.

(56) References Cited

U.S. PATENT DOCUMENTS 6,134,601 A * 10/2000 Spilo .......................... G06F 9/50
711/E12.068
6,658,571 B1 12/2003 O'Brien et al.
(Continued)

FOREIGN PATENT DOCUMENTS

CN 101073063 A 11/2007
CN 102547178 A 7/2012
(Continued)

OTHER PUBLICATIONS

Extended (Supplementary) European Search Report dated Oct. 8, 2020, issued in counterpart EP Application No. 18858920.4. (10 pages).

(Continued)

*Primary Examiner* — Umut Onat
(74) *Attorney, Agent, or Firm* — WHDA, LLP

(57) ABSTRACT

A method and a device for managing a node includes: initiating, by an application program, a first request by calling an interface function, where the first request is used to perform an operation on a feature node in a kernel; searching, based on a keyword of the interface function, a table used for node management for an entry corresponding to the feature node, where the entry includes a node identifier of the feature node and a user handle identifier of the feature node; and performing, by the user program, the operation on the feature node based on the user handle identifier. A program running in user space can be prevented from directly accessing a feature node in kernel space, thereby improving system security.

19 Claims, 10 Drawing Sheets

(51) Int. Cl.
*G06F 16/245* (2019.01)
*G06F 9/445* (2018.01)
*G06F 21/52* (2013.01)

(56) References Cited

U.S. PATENT DOCUMENTS

| | | | |
|---|---|---|---|
| 7,487,548 B1 * | 2/2009 | Conover | G06F 21/52 726/28 |
| 7,950,057 B1 | 5/2011 | Kennedy et al. | |
| 2004/0249957 A1 | 12/2004 | Ekis et al. | |
| 2005/0071856 A1 | 3/2005 | Kumar et al. | |
| 2005/0257093 A1 | 11/2005 | Johnson et al. | |
| 2006/0190722 A1 * | 8/2006 | Sharma | G06F 21/6209 713/165 |
| 2008/0168475 A1 | 7/2008 | De Cesare et al. | |
| 2016/0162272 A1 | 6/2016 | Zhang et al. | |
| 2019/0213014 A1 | 7/2019 | Xia et al. | |

FOREIGN PATENT DOCUMENTS

| | | |
|---|---|---|
| CN | 102629202 A | 8/2012 |
| CN | 103345405 A | 10/2013 |
| CN | 104375849 A | 2/2015 |
| CN | 104679532 A | 6/2015 |
| CN | 105160211 A | 12/2015 |
| CN | 105204937 A | 12/2015 |
| CN | 106815031 A | 6/2017 |
| CN | 107066311 A | 8/2017 |

OTHER PUBLICATIONS

Office Action dated Mar. 15, 2021, issued in counterpart CN application No. 201710856807.9, with English translation. (21 pages).

Office Action dated Feb. 8, 2022, issued in counterpart CN Application No. 201710856807.9, with English Translation. (9 pages).

International Search Report dated Dec. 25, 2018, issued in counterpart application No. PCT/CN2018/106954, with English translation. (15 pages).

* cited by examiner

METHOD AND DEVICE FOR DYNAMICALLY MANAGING KERNEL NODE

CROSS-REFERENCE TO RELATED APPLICATIONS

This application is a continuation of International Application No. PCT/CN2018/106954, filed on Sep. 21, 2018, which claims priority to Chinese Patent Application No. 201710856807.9, filed on Sep. 21, 2017. The disclosures of the aforementioned applications are hereby incorporated by reference in their entireties.

TECHNICAL FIELD

This application relates to the communications field, and more specifically, to a method and a device for dynamically managing a kernel node.

BACKGROUND

In an ANDROID™ system, a kernel is increasingly frequently upgraded. However, due to an original mechanism of the kernel, an entire kernel system is replaced even if one or some functions are upgraded and modified during an upgrade of the kernel. Based on this, a modular policy is used in a latest ANDROID™ version, and hardware and software are completely separated, so as to ensure that a software version used by a user is not limited by a chip platform, thereby achieving an independent upgrade between function modules.

A kernel object (Kernel Object, ko) technology actually implements functions (or referred to as features) by using kernel objects, so that the kernel can support a feature by dynamically loading a ko of the feature. In this way, an ANDROID™ community can maintain a latest kernel version, and once a problem such as a security vulnerability is found, modification can be performed in a timely manner through an independent upgrade, which does not affect an original function of a device, and can repair the security vulnerability in a timely manner.

A LINUX™ kernel currently supports dynamic loading and offloading functions of a module. A compiled kernel feature object (for example, XXX.ko) may be loaded to a memory of the system by using an insmod command, so that the kernel supports the feature. If the feature is not required, the feature may be removed from the memory by using an rmmod command. Other features of the kernel are not affected in the foregoing process.

In the foregoing process, the kernel needs to create a node, so that a program in user space accesses the feature of the kernel. The node may be referred to as a feature node, a kernel node, or a function node. Currently, a node that is usually loaded by using insmod is installed in a/sys/module directory of the kernel. In addition, a name of the node is preset in the program and does not change. In this way, a program in any user space can sense the node and access the node. A parameter in the node may be usually used to control behavior of the feature of the kernel. Consequently, convenience is provided for some malicious programs, and system security is affected.

SUMMARY

This application provides a method and a device for managing a node, so that a program running in user space can be prevented from directly accessing a feature node in a kernel, thereby improving system security.

According to a first aspect, an embodiment of this application provides a method for managing a feature node in a kernel. The method includes:

A first request is initiated by calling are interface function, where the first request is used to perform an operation on a feature node in a kernel.

Specifically, an operating system that supports modular loading of a kernel function includes an application program, an adaptive node manager, and a kernel, where the adaptive node manager includes an interface management module and an encryption management module. The adaptive node manager may also be referred to as a node manager. Specifically, the interface management module may receive the first request that is initiated by the application program by calling the interface function.

Specifically, the first request may be used to perform an open operation, a read operation, a write operation, and a close operation on the feature node in the kernel. It may be understood that, in this embodiment of this application, performing the open operation on the feature node may also be creating the feature node, or loading the feature node, in other words, loading the feature node to a memory of a system. Performing the close operation on the feature node may also be deleting the feature node, or offloading the feature node, in other words, offloading the feature node from the memory of the system.

A table is searched based on a keyword m a function name of the interface function for an entry corresponding to the feature node, where the entry includes a node identifier of the feature node and a user handle identifier of the feature node, the node identifier of the feature node includes the keyword, there is a mapping relationship between the user handle identifier and a kernel handle identifier, and the kernel handle identifier represents an identity of the feature node miming in the kernel.

Herein, the node identifier of the feature node may be used to uniquely identify the feature node. Specifically, the node identifier of the feature node may be a name of the feature node.

Specifically, the encryption management module searches, based on the interface function, the table used for node management for the entry corresponding to the feature node.

The user program performs the operation on the feature node based on the user handle identifier.

Specifically, the interface management module returns the user handle identifier to the user program, and the user program performs the operation on the feature node based on the user handle identifier.

Therefore, in this embodiment of this application, the first request that is used to perform the operation on the feature node is sent by calling the interface function, and the table used for node management (for example, a hash table) is searched for the entry of the feature node. The entry includes the user handle identifier that has a mapping relationship with the kernel handle identifier, and then the operation corresponding to the first request is performed on the feature node based on the user handle identifier. Therefore, in this embodiment of this application, the user handle identifier can be obtained by searching for the entry of the feature node, and the operation is performed on the feature node based on the user handle identifier, so that a coupling relationship between user space and the feature node in the kernel can be removed, and a program running in the user space performs a transparent operation on the feature node in the kernel, in other words, the program running in the user space can be prevented from directly accessing, the feature node in the kernel in this embodiment of this application, thereby improving system security.

In this embodiment of this application, the following interface function may be defined:

int XXX_FEATURE_IOCTL (int cmd, int arg), where cmd is a control command parameter, and may support an open operation, a close operation, a read operation, and a write operation; and arg is an address corresponding to a parameter required by cmd. If cmd is a read command or a write command, arg is a corresponding data buffer (buffer) address. XXX may be a keyword in a function name of the interface function.

A return value of the interface function may indicate whether the operation succeeds. For example, if the return value is greater than or equal to 0, it indicates that the operation succeeds; or if the return value is less than 0, it indicates that the operation fails. Specifically, when the operation succeeds, the foregoing user handle identifier may be returned; or when the operation fails, a negative value indicating an error cause may be returned.

Optionally, in this embodiment of this application, the method further includes: The node identifier of the feature node is determined.

Specifically, the adaptive node manager further includes a node creation management module and a loading/offloading management module.

If the first request is not used to delete the feature node, before the encryption management module returns the user handle identifier to the user program, the node creation management module determines the node identifier of the feature node.

The feature node is loaded based on the node identifier of the feature node.

Specifically, the loading/offloading management module sends the node identifier to the kernel, and the kernel loads the feature node based on the node identifier.

When the feature node is successfully loaded, the entry including the node identifier of the feature node and the user handle identifier of the feature node is added to the table, where the user handle identifier is a handle identifier in user space to which the kernel handle identifier of the feature node is mapped. Specifically, the encryption management module may add the entry to the table used for node management.

In this case, when the entry corresponding to the feature node is not found, a request for loading the feature node may be sent to the kernel. When the kernel successfully loads the feature node, the entry corresponding to the kernel node is added to the table used for node management. Therefore, in this embodiment of this application, the kernel node can be dynamically created according to an access requirement of the program m the user space.

Optionally, in this embodiment of this application, before the feature node is loaded based on the node identifier of the feature node, the method further includes:

a storage path of the feature node is determined, where the storage path is used to indicate a path along which the feature node is loaded to a memory; and that the feature node is loaded based on the node identifier of the feature node includes:

the feature node is loaded based on the node identifier and the storage path of the feature node.

Specifically, the node creation management module may further determine the storage path of the feature node, the loading/offloading module sends the storage path to the kernel, and the kernel loads the feature node based on the storage path.

In this embodiment of this application, kernel nodes of different security levels may exist in different partitions. For example, a security partition may store some information about privacy, payment, and the like that requires high security. The partition may be configured with a high-security-level storage management manner, for example, a kernel node in the partition is accessed only when a security password is entered. A system partition may store some information about system-level data, a system-level program, and the like. The partition may be configured with a medium-security-level storage management manner, for example, the partition is accessed only when a system permission is obtained. A user partition may store data information of less importance such as common data of some users and a third-party program. The partition may be configured with a low-security-level storage management manner, for example, the partition may be read or written by configuring an access permission of the user.

In this case, compared with a preset node name and a fixed storage path in the related art, in this embodiment of this application, the feature node can be created in a proper area based on a security level or an importance degree of the feature node, and the hash table can be updated. Therefore, in this embodiment of this application, only an application program related to the kernel node can access the kernel node, and another program in the user space cannot sense the feature node, thereby improving system security.

Optionally, in this embodiment of this application, before the feature node is loaded based on the node identifier of the feature node, the method further includes:

an access permission of the feature node is determined, where the access permission is used to indicate an application program that is allowed to access the feature node; and that the feature node is loaded based on the node identifier of the feature node includes:

the feature node is loaded based on the node identifier and the access permission of the feature node.

Specifically, the node creation management module may further determine the access permission of the feature node, the loading/offloading module sends the storage path to the kernel, and the kernel loads the feature node based on the access permission.

Optionally, in this embodiment of this application, the entry further includes the access permission of the feature node. The method further includes:

the application program pass the user handle identifier by using, the interface function; and the access permission of the feature node is determined in the entry of the feature node based on the user handle identifier.

Specifically, the interface management module may further receive the user handle identifier that is passed by the application program by using the interface function. The encryption management module determines the access permission of the feature node in the entry of the feature node based on the user handle identifier.

If the access permission allows the application program to access the feature node, the operation corresponding to the first request is performed on the feature node; or if the access permission does not allow the application program to access the feature node, the encryption management module rejects the first request.

In a possible implementation, when the feature node is accessed for the first time, the application program may directly call the interface function to access a feature node provided by the kernel, and may directly search, based on a function name of the interface function, the hash table for an entry corresponding to the function name. When the entry corresponding to the function name is not found, the entry may be established. A user handle identifier returned by the node manager is obtained, and then the hash table is searched for the entry based on the user handle identifier. When the application program finds, based on the function name of the interface function, the entry corresponding to the function name in the hash table, the operation corresponding to the request may be performed.

In another possible implementation, when the feature node is accessed not for the first time, the node manager may search the bash table for the entry based on a user handle identifier passed by the interface function (namely, a user handle identifier returned when the feature node is accessed last time). When the entry corresponding to the user handle identifier is not found (for example, the feature node has been dynamically offloaded), a second request is rejected, and an identifier indicating an access failure is returned to the user program, for example, the identifier may be a negative number, and the negative value may indicate a cause for access rejection. When the entry corresponding to the user handle identifier is found, the operation corresponding to the request may be performed.

Optionally, when the access permission allows a current process to access the feature node, accessing an attribute of the node may be requested by calling the interface function. In this case, a dialog box indicating whether the current process is allowed to access the feature node is popped up in a user interface, to obtain authorization information of a user. When the user rejects the access, the required function exits, and an identifier indicating an access failure is returned to the user program, for example, the identifier may be a negative number, and the negative value may indicate a cause for access rejection. If the user allows access of the current program, the operation corresponding to the request may be performed.

Therefore, in this embodiment of this application, when the feature node is accessed by calling the interface function, a permission of a current process corresponding to the application program may be determined based on the access permission of the feature node corresponding to the interface function. In this way, transparent management of the process can be implemented, in other words, another application program that fails security authentication cannot access the feature node corresponding to the process, thereby ensuring secure access of the node.

In addition, according to the method for managing a node in this embodiment of this application, a development program can be simplified, and a to-be-accessed feature node can be statically configured. Specifically, a developer does not need to learn in detail a storage location of each feature node, a read/write permission required by each feature node, and the like. The process can run in the system, and the process has a specific permission. Therefore, according to the method, a feature node that needs to be accessed by the process may be directly set based on the permission of the process. In this way, not only a program accessing the node is simplified, but also security of the kernel node of the system is enhanced. The program can sense only a feature node with which the program needs to communicate, and cannot sense or access another node. Further, the developer does not need to learn an SE policy, and does not need to modify a file XXX.te, which improves program development efficiency.

Optionally, in this embodiment of this application, the entry further includes a reference counter of the feature node.

When the node creation management module creates the feature node, the encryption management module sets a count value of the reference counter to a default value.

The count value of the reference counter is increased if the first request is used to perform a read operation or a write operation on the feature node. For example, the count value is increased by 1.

The count value of the reference counter is decreased if the first request is used to delete the feature node. For example, the count value is decreased by 1, and when the count value is equal to a first preset value, the feature node is detected. Specifically, the loading/offloading management module may delete the feature node.

Optionally, in this embodiment of this application, if the first request is used to delete the feature node, whether the feature node is in a whitelist is queried, where the whitelist includes a feature node that does not need to be deleted. Specifically, the loading/offloading management module may perform a query operation.

If the feature node is not in the whitelist and the count value is equal to the first preset value, the feature node is deleted. If the feature node is in the whitelist, the feature node is not deleted.

Optionally, the entry further includes a timer, and the timer is started when the count value is equal to the first preset value. When the timer is equal to a second preset value, if the application program does not initiate, by calling the first interface function, a second request that is used to perform an operation on the feature node, and the second request is not used to delete the feature node, the feature node is deleted.

When the timer is less than the second preset value, if the interface management module receives the second request that is initiated by the application program by calling the first interface function, the timer stops timing, and the feature node is not deleted.

In this embodiment of this application, the node manager may further include a permission management module, a clock management module, and a concurrency management module. The permission management module is mainly configured to dynamically configure, based on a permission of a used program, a node that needs to be accessed by the program. The clock management module is configured to manage a clock that needs to be used in the node manager. The concurrency management module supports multi-threaded process concurrency, and can manage a conflict between each process and each thread.

Therefore, during feature node access in the kernel, a required feature node may be loaded to the memory by dynamically loading/offloading the feature node in this application, and when a feature node is not required, the feature node is removed from the memory. In this way, system resources such as a memory, a CPU, and I/O of the system occupied by a useless feature node can be reduced, so that the system can provide more resources for another running application program or service, thereby ensuring system performance.

According to a second aspect, an embodiment of this application provides a device for managing a node, configured to perform the method in any one of the first aspect or the possible implementations of the first aspect. Specifically, the device includes a module configured to perform the method in any one of the first aspect or the possible implementations of the first aspect.

According to a third aspect, an embodiment of this application provides a terminal device, including a memory and a processor. The memory is configured to store an instruction. The processor is configured to execute the instruction stored in the memory. When the processor executes the instruction stored in the memory, the execution enables the processor to perform the method in any one of the first aspect or the possible implementations of the first aspect.

According to a fourth aspect, an embodiment of this application provides a computer readable medium, configured to store a computer program, where the computer program includes an instruction for performing the method in any one of the first aspect or the possible implementations of the first aspect.

DESCRIPTION OF EMBODIMENTS

The following describes technical solutions of this application with reference to accompanying drawings.

Figure 1:
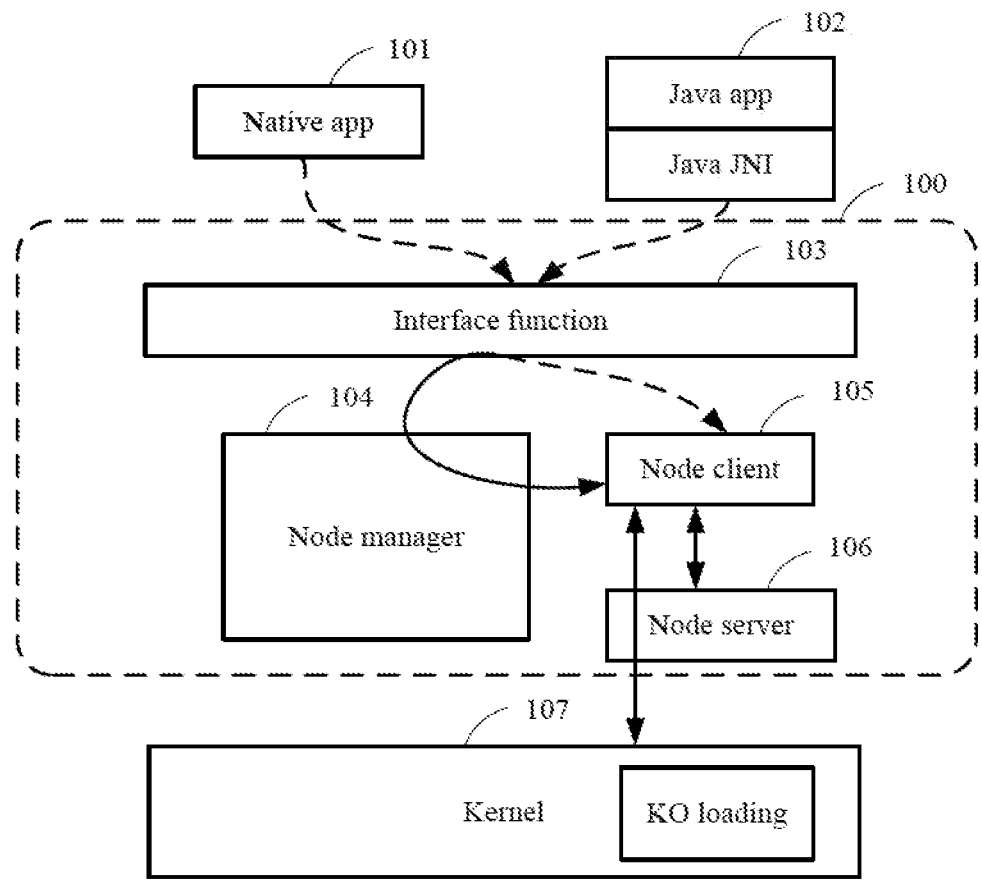
FIG. 1 is a schematic diagram of a system architecture according to an embodiment of this application.

FIG. 1 is a schematic diagram of a system architecture according to an embodiment of this application. In this embodiment of this application, a node created in kernel space may be referred to as a feature node, a kernel node, or a function node. When an application program (for example, a native app (Native APP) 101 and a JAVA™ app 102) in user space needs to access a function provided by a kernel, the application program performs an operation by using a negotiated interface function 103 instead of directly enabling the kernel node. Specifically, data is transmitted between the interface function 103, and the native app 101 and the JAVA™ app 102 through a communications line (a dashed arrow shown in FIG. 1). Herein, the application program may also be referred to as a user program.

Herein, the application programs in the user space may be, for example, the native app 101 and the JAVA™ app 102 shown in FIG. 1, and may be other apps, for example, other program apps such as a web app and a PYTHON™ app. This is not limited in this embodiment of this application. When the application program is the JAVA™ app 102, the application program may further include a JAVA™ native interface (JNI), and the JAVA™ program may directly call a local function in a system through the JNI.

The interface function 103 is specifically implemented in a service module 100. The service module 100 may include the interface function 103, a node manager 104, a node client 105, and a node server 106. Specifically, control information may be transmitted between the interface function 103, the node manager 104, and the node client 105 through a control line (a solid arrow shown in FIG. 1). In addition, data may be transmitted between the interface function 103, the node client 105, and the node server 106 through a communication line. The control information may be transmitted between the node client 105 and a kernel 107 through the control line.

In this embodiment of this application, the service module 100 can remove a coupling relationship between the user space and a feature node in the kernel 107, so that the program running in the user space performs a transparent operation on the feature node in the kernel 107, in other words, the program running in the user space is not expected to directly access the feature node, thereby improving system security.

Figure 2:
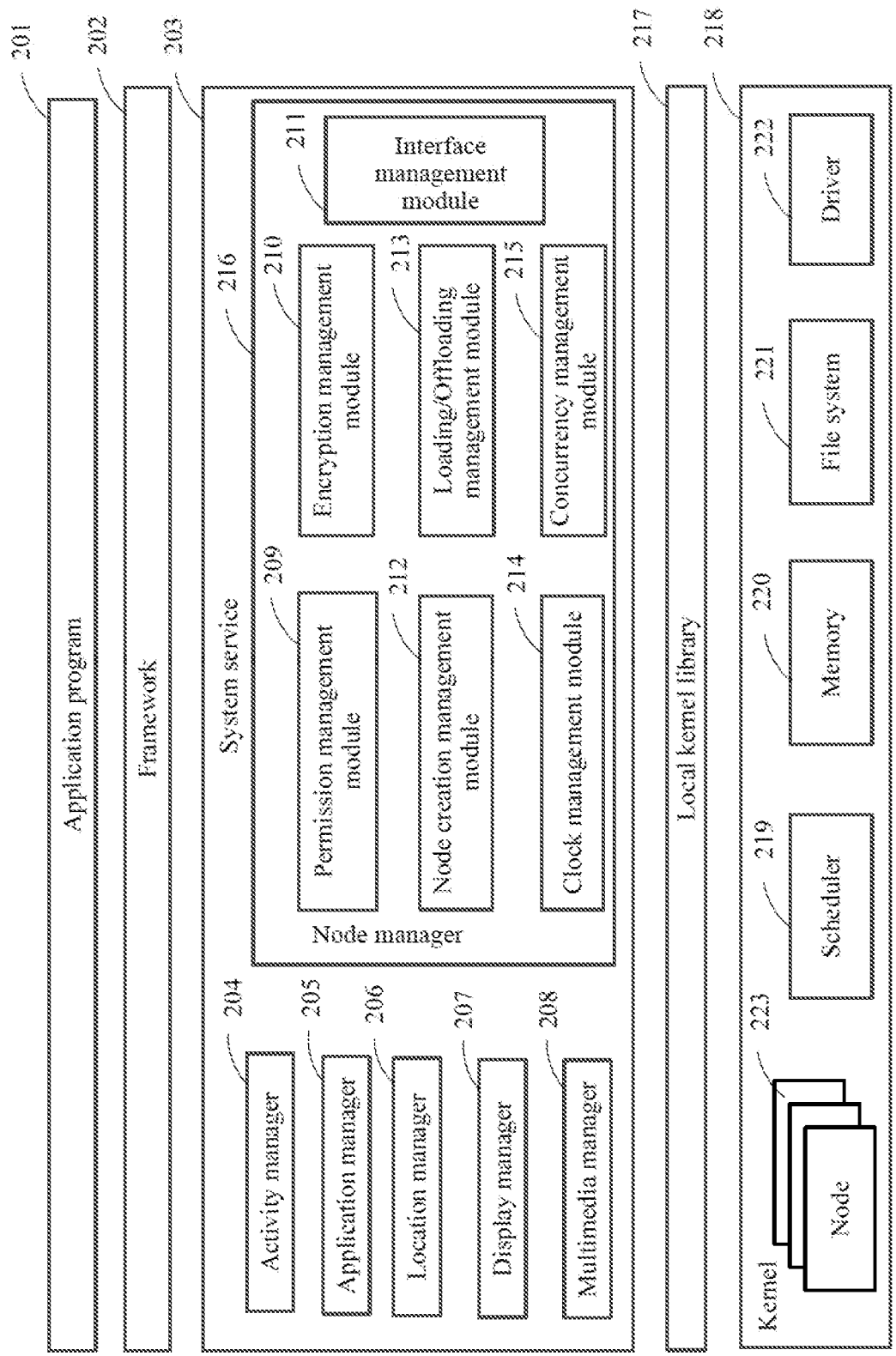
FIG. 2 is a schematic diagram of another system architecture according to an embodiment of this application.

FIG. 2 is a schematic diagram of another system architecture according to an embodiment of this application. In the architecture shown in FIG. 2, an application program 201 may include a plurality of different application programs, for example, may be the native app 101, the JAVA™ app 102, or another app in FIG. 1. A framework (Framework) 202 is a framework of user space, and is middleware for interaction between the application program and the system. A system service 203 is a service in the user space, including a node manager 216 and various feature services provided for each service and program. The various feature services are, for example, an activity manager 204, an application manager 205, a location manager 206, a display manager 207, and a multimedia manager 208. A local kernel library 217 is a kernel library provided by the system, including a function of a dedicated function, such as libc or Sqlite. A kernel 218 includes, for example, a scheduler 219, a memory 220, a file system 221, a driver 222, and a node 223. The node 223 may include one or more nodes, and each node can support a function or a feature corresponding to the node.

The node manager 216 may include, for example, a permission management module 209, an encryption management module 210, an interface management module 211, a node creation management module 212, a loading/offloading management module 213, a clock management module 214, and a concurrency management module 215.

The permission management module 209 is mainly configured to dynamically configure, based on a permission of a used program, a node that needs to be accessed by the program. The encryption management module 210 includes a table used for feature node encryption management, for example, a hash table that is used to manage a status used by a node. The encryption management module 210 can map a kernel node in the system to an ID used by a program in the user space. The interface management module 211 provides a universal interface for the user program. The loading/offloading management module 213 dynamically manages an opened node based on a node status in the hash table by using a clock. The clock management module 214 is configured to manage a clock that needs to be used in the node manager 216. The node creation management module 212 manages a created node based on a message entered by an interface and node information in the hash table. The concurrency management module 215 supports multi-threaded process concurrency, and can manage a conflict between each process and each thread.

It should be noted that in this embodiment of this application, an example in which the table used for encryption management in the encryption management module 210 is the hash table is used for description. However, in this embodiment of this application, the table is not limited to the hash table, and may be another table having a mapping relationship. This is not limited in this embodiment of this application. When the table in the encryption management module is the hash table, the encryption management module may also be referred to as a hash management module.

Figure 3:
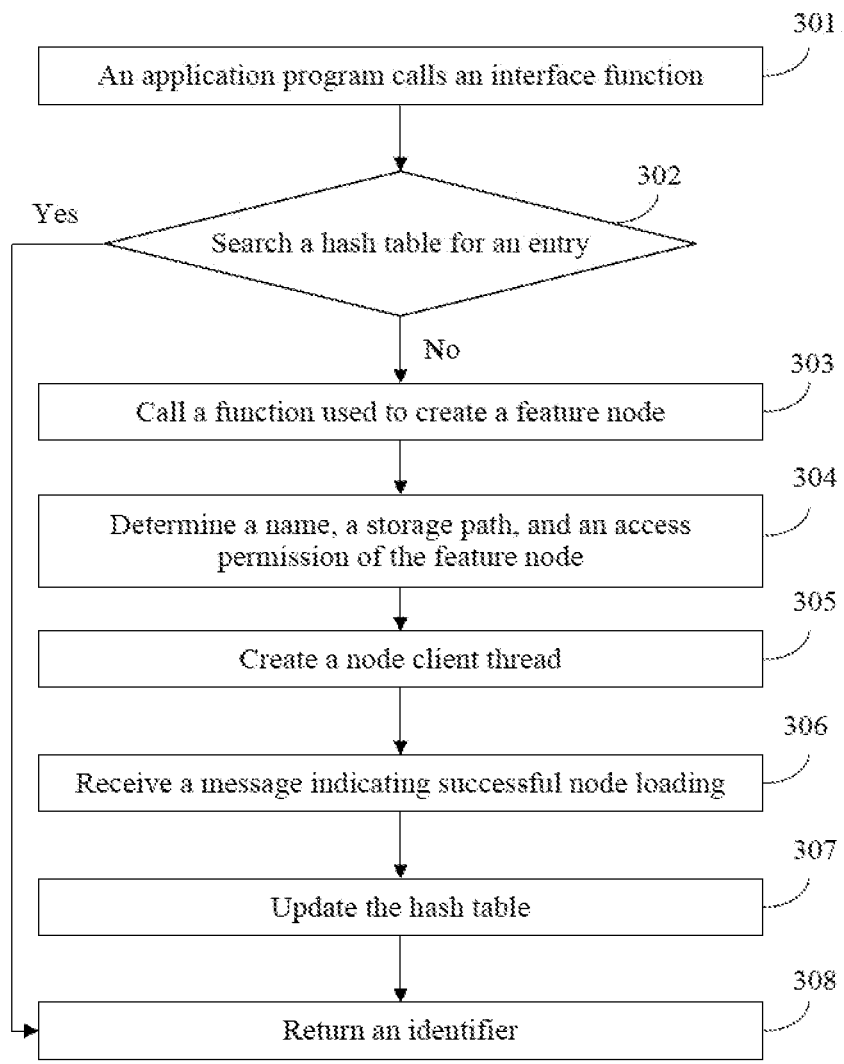
FIG. 3 is a schematic flowchart of a method for managing a node according to an embodiment of this application.

FIG. 3 is a schematic flowchart of a method for managing a node according to an embodiment of this application. It should be understood that FIG. 3 shows steps or operations of the method for managing a node. However, these steps or operations are merely an example, and other operations or variants of the operations in FIG. 3 may be alternatively performed in this embodiment of this application. In addition, the steps in FIG. 3 may be performed based on a sequence different from a sequence presented in FIG. 3, and it is possible that not all operations in FIG. 3 need to be performed.

301. A user program calls an interface function.

In this embodiment of this application, a node manager 216 may provide some native interfaces (native APIs), so that the user program accesses a kernel node. The interface herein may also be referred to as an interface function. In this embodiment of this application, the following interface may be defined:

int XXX_FEATURE_IOCTL (int cmd, int arg), where cmd is a control command parameter, and may support an open (open) operation, a deletion (close) operation, a read (read) operation, and a write (write) operation; and arg is an address corresponding to a parameter required by cmd. If cmd is a read command or a write command, arg is a corresponding data buffer (buffer) address. XXX may be a keyword in a function name of the interface function. A return value of the interface may indicate whether the operation succeeds. For example, if the return value is greater than or equal to 0, it indicates that the operation succeeds; or if the return value is less than 0, it indicates that the operation fails.

It may be understood that, in this embodiment of this application, performing the open operation on the feature node may also be creating the feature node, or loading the feature node, in other words, loading the feature node to a memory of a system. Performing the close operation on the feature node may also be deleting the feature node, or offloading the feature node, in other words, offloading the feature node from the memory of the system.

Specifically, an interface management module 211 may receive a request that is initiated by the application program by calling the interface function, where the request is used to perform the operation on the feature node in a kernel. In 301, the request may be a request for performing one of the open operation, the read operation, the write operation, or the like on the feature node.

In this embodiment of this application, the node manager 216 may dynamically load the kernel node, and therefore the node manager 216 may be referred to as an adaptive node manager. In other words, the node manager may load one feature node to the memory when the application program needs to access the feature node. For example, when the application program calls the interface function, the control command parameter may be used to directly indicate the open operation, to create the feature node. Alternatively, when the application program needs to access the feature node, the control command parameter may be used to indicate the read operation or the write operation, to access the feature node. However, in this case, if there is no to-be-accessed feature node, the node manager may set the control command parameter to the open operation, to create a feature node.

In this embodiment of this application, one interface function 103 may correspond to one feature node in the kernel. In other words, the application program may access different feature nodes in the kernel by calling different interface functions.

In this embodiment of this application, a node identifier may uniquely identify the kernel node. In a specific implementation, the function name of the interface function and the node identifier of the kernel node have a same keyword, and the keyword may be, for example, a function corresponding to the node. When receiving a first request that is initiated by the application program by calling an interface function, the interface management module 211 can determine, based on a function name of the interface function, a node identifier of a feature node that needs to be accessed by the application program, and may further determine the feature node that needs to be accessed. Therefore, when the application program calls a first interface function, the node manager 216 may determine a function or a feature node that needs to be accessed by the application program and that corresponds to the first interface function.

In addition, specifically, the node identifier may be a name of the kernel node. For ease of understanding, an example in which the node identifier of the kernel node is the name of the kernel node is used for description below. However, this embodiment of this application is not limited thereto.

It may be understood that when the application program needs to access a feature node in the kernel to complete a function, an interface function corresponding to the function in the node manager 216 may be called. In other words, the application program may access different nodes in the kernel by calling different interface functions, so as to implement different functions.

For example, when the application program needs to implement a photographing function, an interface function corresponding to the photographing function such as a Camaro_FEATURE_IOCTL (int cmd, int are) interface function in the node manager 216 may be called. In this case, the keyword may be Camaro. For another example, when the application program needs to use a pay function, an interface function corresponding to the pay (Pay) function such as a Pay_FEATURE_IOCTL (int cmd, int arg) interface function in the node manager 216 may be called. In this case, the keyword may be Pay.

It should be noted that in this embodiment of this application, different application programs may call a same interface function to access a feature node. For example, an application program having a picture processing function may also call the Camaro_FEATURE_IOCTL (int cmd, int arg) interface function in the node manager 216.

302. Search a hash table for an entry.

A hash management module constructs in advance the hash table used for encryption management, and the hash management module may update the hash table based on a loading/offloading status of the feature node. Specifically, based on the interface function in step 301, the hash table is searched for the entry corresponding to the feature node. The entry includes a name and a user handle identifier (user handle ID) of the feature node. The name of the feature node and the function name of the interface function have a same keyword, there is a mapping relationship between the user handle identifier and a kernel handle identifier (kernel handle ID), and the kernel handle identifier represents an identity of the feature node miming in the kernel.

The user handle identifier may also be referred to as a user program identifier (user program ID), and the kernel handle identifier may also be referred to as a kernel program identifier (kernel program ID). It may be understood that the user handle identifier may be a virtual ID of the feature node, and the virtual ID may uniquely correspond to the kernel program ID in the kernel by using the hash table. For example, the user program ID may be obtained by increasing the kernel program ID by one offset value. Because the kernel program ID is a real address of the feature node in the kernel, in this embodiment of this application, a program in user space performs a transparent operation on the feature node in the kernel.

Specifically, the node manager 216 searches the local hash table to determine whether there is an entry of a feature node corresponding to the interface function. If the entry is found, it indicates that there is the feature node corresponding to the interface function, and 308 is performed. If the entry is, not found, it indicates that there is no feature node corresponding to the interface function. In this case, the feature node may be created, and 303 is performed next.

303. Call a function used to create a feature node.

Specifically, when the entry corresponding to the feature node is not found in the hash table, a node creation management module 212 may call an internal function used for feature node creation, such as create_FEATURE ( ).

304. Determine a name, a storage path, and an access permission of the feature node.

Specifically, the name of the feature node that needs to be created may be determined by parsing the create_FEATURE ( ) function.

In addition, optionally, in 304, the storage path of the feature node and/or the access permission of the application program to the feature node may be further obtained by parsing the create_FEATURE ( ) function. Specifically, the storage path and the access permission of the feature node may be determined based on a function corresponding to the feature node. Herein, the storage path is used to indicate a path along which the feature node is loaded to the memory, and the access permission is used to indicate an application program that is allowed to access the feature node.

For example, a security level required by a kernel node that implements the photographing function may be lower than a security level required by a kernel node that implements the pay function. Therefore, the Pay_FEATURE_IOCTL kernel node and the Camaro_FEATURE_IOCTL kernel node may exist in different partitions.

Specifically, a security partition may store some information about privacy, payment, and the like that requires high security. The partition may be configured with a high-security-level storage management manner, for example, a kernel node in the partition is accessed only when a security password is entered. A system partition may store some information about system-level data, a system-level program, and the like. The partition may be configured with a medium-security-level storage management manner, for example, the partition is accessed only when a system permission is obtained. A user partition may store data information of less importance such as common data of some users and a third-party program. The partition may be configured with a low-security-level storage management manner; for example, the partition may be read or written by configuring an access permission of the user.

Therefore, compared with a preset node name and a fixed storage path in the related art, in this embodiment of this application, different storage paths may be allocated to and different access permissions may be configured for different nodes based on attributes of the node (for example, a security attribute). In this way, the kernel node in this embodiment of this application is invisible to another application program, thereby improving system security.

305. Create a node client thread.

Specifically, the node creation management module 212 may create the node client (Node Client) thread based on the name, the storage path, and the access permission, and a concurrency management module 215 may concurrently manage one or more client thread processes in the node manager 216.

306. Receive a message indicating that a node is successfully created.

Specifically, after the node client thread is created, the node creation management module 212 may wait for a return message indicating whether the feature node is successfully created.

The node client thread sends, to a node server (which may be a daemon server), a request for loading the feature node. Specifically, the node server may call an insmod function by using the system, and instruct the kernel to load the feature function, in other words, send the request to the kernel. After sending the request, the node server waits for the return message indicating whether the feature node is successfully created.

Figure 4:
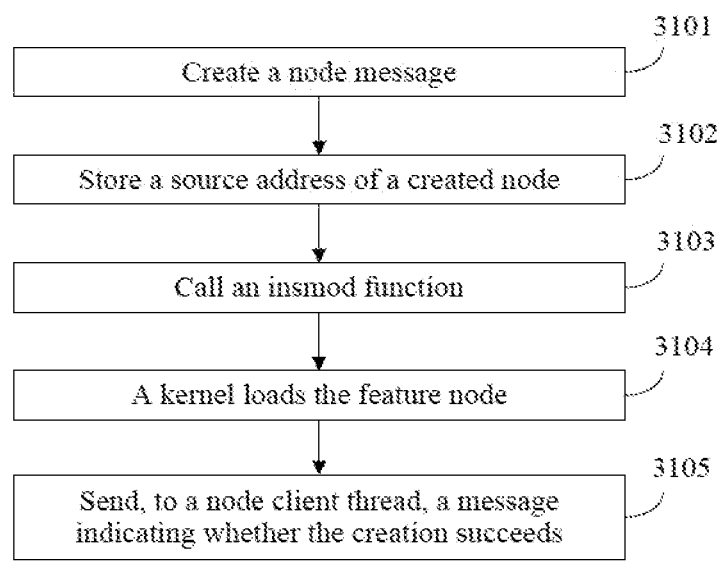
FIG. 4 is a schematic flowchart in which a node server and a kernel load a feature node.

FIG. 4 is a schematic flowchart in which the node server and the kernel load a feature node.

3101. The node server creates a node message.

3102. The node server stores a source address of a created feature node.

3103. The node server calls an insmod function, where the insmod function may send a notification message to the kernel, and the notification message is used to instruct the kernel to load the feature node.

3104. The kernel loads the feature node.

In this case, there may be two loading results of the kernel: One is that the kernel successfully loads the feature node, and the other is that the kernel fails to load the feature node. The kernel may send, to the node server, a response message indicating whether the feature node is successfully loaded.

3105. The node server sends a return message to a node client based on the received response message sent by the kernel.

When the response message that is sent by the kernel and that is received by the node server indicates that the feature node is successfully created, the node server sends, to the node client, a return message indicating that loading succeeds. The return message may include a user program ID and a kernel program ID. The node client then transmits, to the node creation management module, a return message indicating that creation succeeds.

When the kernel fails to load the feature node, the kernel returns a failure value (the failure value is a negative value) to the node server, and the failure value may indicate a failure cause. When the node server receives the failure value sent by the kernel, the node server returns the failure value to the node client. The node client then returns the failure value to the node manager 216. The node manager 216 may continue to return the failure value to the application program in the user space by using the interface function.

307. Update the hash table.

Specifically, when the return message indicates that the feature node is successfully loaded, the hash management module updates the locally stored hash table based on received information. Specifically, the hash management module may add an entry to the hash table, where the entry may include a name, a storage path, an access permission, the kernel handle ID, the user handle ID, and the like of the feature node.

In some possible implementations, the entry may further include a reference counter of the feature node, a creation time TM of the node, and other information.

308. Return an identifier.

Specifically, when the hash management module finds the entry of the feature node in the hash table in 302, the user handle identifier is returned to the application program in the user space.

When the entry of the feature node is not found in 302, the node manager may interact with the kernel, to create the feature node, and update the hash table. After the feature node is created, the node manager returns the user handle identifier of the feature node to the application program in the user space.

When the feature node fails to be created, a corresponding identifier ID may be returned, for example, the identifier ID may be the foregoing failure value, and the failure value may indicate a failure cause.

In this embodiment of this application, the user program initiates, by calling the interface function provided by the node manager, a request for accessing the kernel node, and the node manager searches, based on the request, the hash table for the entry corresponding to the kernel node. When the entry is not found in the hash table, the node manager may send, to the kernel, a request for loading the feature node. When the kernel successfully loads the feature node, the node manager adds the entry corresponding to the kernel node to the hash table. Therefore, in this embodiment of this application, the node manager can dynamically create a kernel node according to an access requirement of the user program.

In addition, in this embodiment of this application, the feature node can be created in a proper area based on a security level or an importance degree of the feature node, and the hash table can be updated. Therefore, in this embodiment of this application, only an application program related to the kernel node can access the kernel node, and another program in the user space cannot sense the feature node, thereby improving system security.

Figure 5:
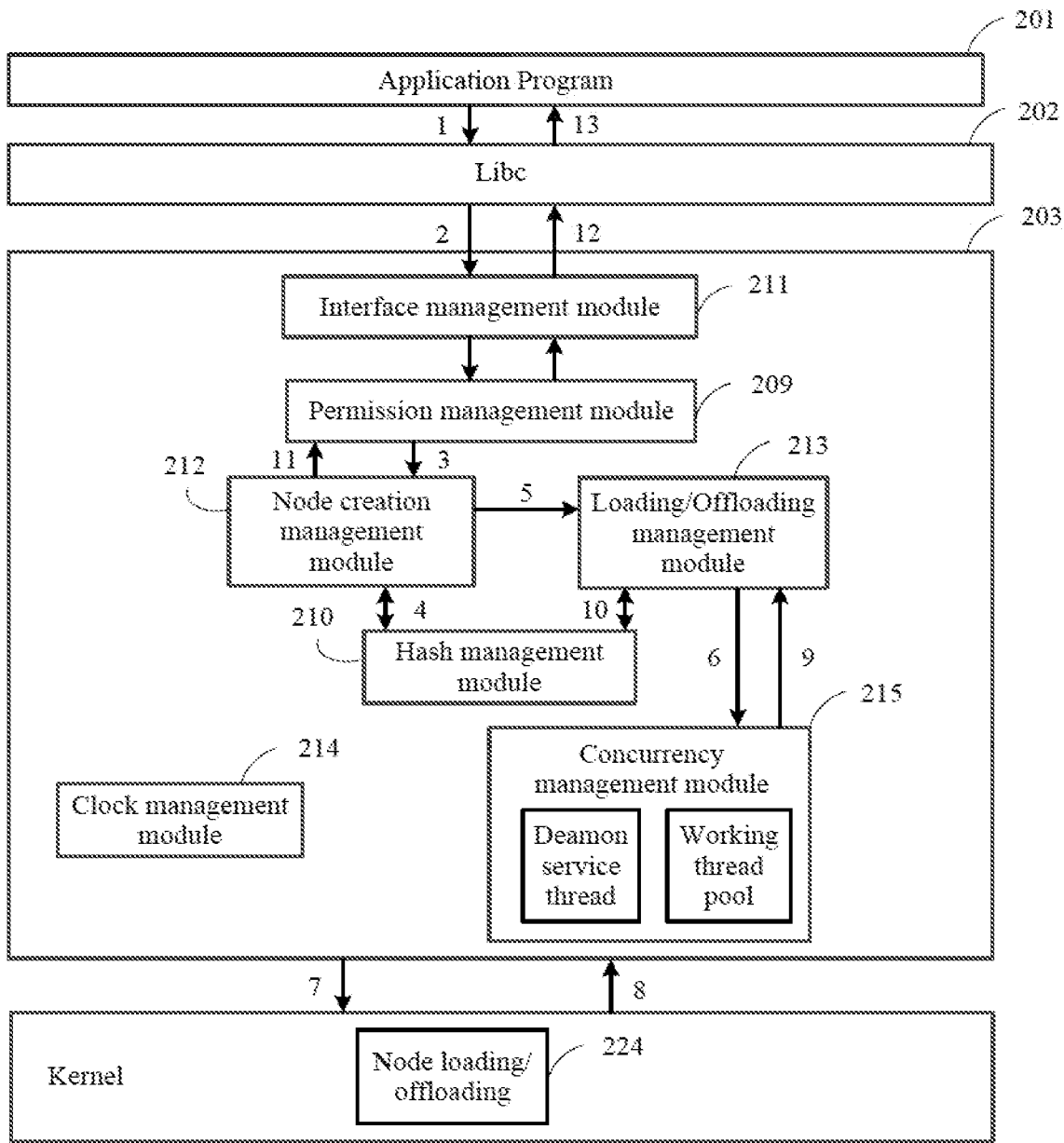
FIG. 5 is a schematic flowchart of node creation according to an embodiment of this application.

FIG. 5 is a schematic flowchart of node creation according to an embodiment of this application. Herein, an example in which an application program needs to access a feature node that has a pay function is used for description with reference to a schematic block diagram of a node manager.

In a command-based request stage, an application program 201 calls a corresponding feature function by using, an API interface (as shown in step 1). Specifically, the application program may initiate, by calling Pay_FEATURE_IOCTL (int cmd, int arg), a command-based request for accessing a pay feature node.

An interface management module 211 in a node manager 203 receives the command-based request that is initiated by the API and that is from the application program or a service (as shown in step 2). The API may be specifically Pay_FEATURE_IOCTL (int cmd, int arg).

After receiving the command-based request, the interface management module 211 pass an internal command processing stage of the node manager 203. In this case, a permission management module 209 may check whether an operation of the process is allowed. If the operation is prohibited, the process ends. If the operation is allowed, a next operation is performed.

When a hash management module 210 cannot find a feature node corresponding to Pay_FEATURE_IOCTL in a hash table, the hash management module 210 may send, to a node creation management module 212, a request for creating a pay feature node (as shown in step 3). After the pay feature node is created, the node creation management module 212 exchanges data with the hash management module 210, and updates an entry of the feature node corresponding to Pay_FEATURE_IOCTL in the hash table (as shown in step 4). The node manager 203 performs agent management on the kernel node by using the hash table, so as to implement an information agent.

After the hash entry is updated, the node creation management module 212 may send, to a loading/offloading management module 213, a request for loading the feature node (as shown in step 5). The loading/offloading management module 213 may exchange data with a concurrency management module 215 (as shown in step 6), to determine whether to load the kernel node (that is, deliver a command). If the loading/offloading module 213 determines to load/offload the feature node, the loading/offloading module 213 sends a load/offload request to the concurrency management module 215 (as shown in step 6). The concurrency management module 215 may perform interactive communication with the kernel in a thread pool manner (that is execute a command).

Then, the process enters a kernel processing stage. The kernel receives a loading/offloading command sent by the concurrency management module 215 (as shown in step 7), and completes loading/offloading of the kernel node.

After completing the loading/offloading operation on the feature node, the kernel sends a return message to the concurrency management module 215 (as shown in step 8). The concurrency management module 215 may send the return message to the loading/offloading management module 213 (as shown in step 9). The loading/offloading management module 213 sends the return message to the hash management module based on the return message, so that the hash management module 210 updates the entry of the pay feature node in the hash table based on the return message (as shown in step 10). In this case, the node creation management module 212 may send a response message indicating that creation is completed to the permission management module 209 (as shown in step 11). Then, the interface management module 211 may send the return message to the application program 201 (as shown in step 12). When the application program 201 receives a return message indicating that the operation of the interface function succeeds, calling of the API function is completed.

In this embodiment of this application, the user program initiates, by calling the interface function provided by the node manager, the request for accessing the kernel node, and the node manager searches, based on the request, the hash table for the entry corresponding to the kernel node. When the entry is not found, the node manager sends, to the kernel, the request for loading the feature node. When the kernel successfully loads the feature node, the node manager adds the entry corresponding to the kernel node to the hash table. Therefore, in this embodiment of this application, the node manager can dynamically create the kernel node according to an access requirement of the user program.

In addition, in this embodiment of this application, the feature node can be created in a proper area based on a security level or an importance degree of the feature node, the hash table is updated, and the kernel node is managed by using the hash table, so that only an application program related to the kernel node can access the kernel node, and another program in the user space cannot sense the feature node, thereby improving system security.

Figure 6:
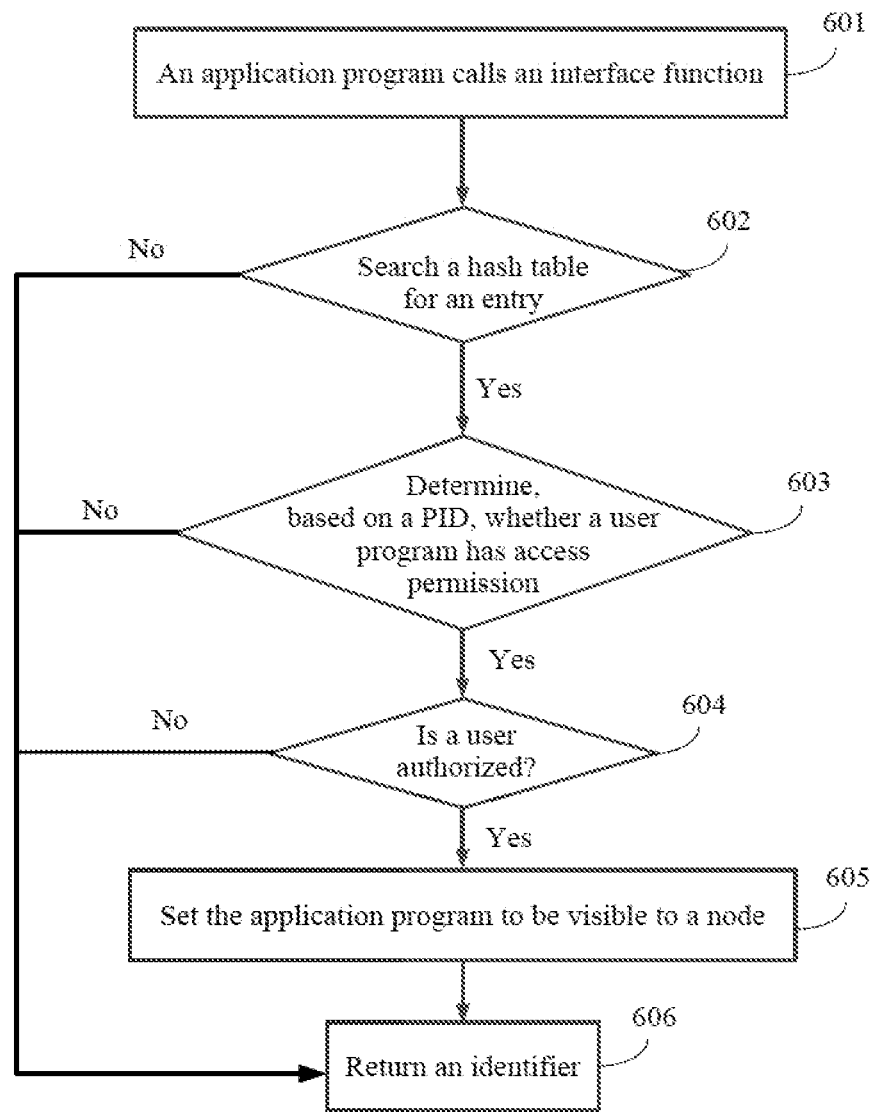
FIG. 6 is a schematic flowchart of a method for managing a node according to an embodiment of this application.

FIG. 6 is a schematic flowchart of a method for managing a node according to an embodiment of this application. It should be understood that FIG. 6 shows steps or operations of the method for managing a node. However, these steps or operations are merely an example, and other operations or variants of the operations in FIG. 6 may be alternatively performed in this embodiment of this application. In addition, the steps in FIG. 6 may be performed based on a sequence different from a sequence presented in FIG. 6, and it is possible that not all operations in FIG. 6 need to be performed.

601. An application program calls an interface function.

Specifically, an interface management module 211 may receive a request that is initiated by the application program by calling the interface function, where the request is used to perform an operation on a feature node in a kernel. In 601, the request may be a request for performing one of an open operation, a read operation, a write operation, or the like on the feature node.

Specifically, for description of the interface function, refer to the description in 301. To avoid repetition, details are not described herein again.

602. Search a hash table for an entry.

Specifically, a node manager searches the local hash table to determine whether there is an entry of a feature node corresponding to the interface function. If the entry is found, it indicates that there is the feature node corresponding to the interface function, and 603 is performed. If the entry is not found, it indicates that there is no feature node corresponding to the interface function and a corresponding ID is directly returned, for example, the corresponding ID may be a negative number, and the negative number may indicate a failure cause.

Specifically, for the entry in 602, refer to the foregoing description in 302. To avoid repetition, details are not described herein again.

In a possible implementation, when the feature node is accessed for the first time, the application program may directly call the interface function to access a feature node provided by the kernel, and may directly search, based on a function name of the interface function, the hash table for an entry corresponding to the function name. When the entry corresponding to the function name is not found, the entry may be established. A user handle identifier returned by the node manager is obtained, and then the hash table is searched for the entry based on the user handle identifier according to the foregoing method. When the application program finds, based on the function name of the interface function, the entry corresponding to the function name in the hash table, 603 may be performed.

In another possible implementation, when the feature node is accessed not for the first time, the node manager may search the hash table for the entry based on a user handle identifier passed by the interface function (for example, the user handle identifier returned in FIG. 3, namely, a user handle identifier returned when the feature node is accessed last time). When the entry corresponding to the user handle identifier is not found (for example, the feature node has been dynamically offloaded), a second request is rejected, and 606 is performed: An identifier indicating an access failure is returned to the user program, for example, the identifier may be a negative number, and the negative value may indicate a cause for access rejection. When the entry corresponding to the user handle identifier is found, 603 is performed.

603. Determine, based on a PID of the user program, whether the user program has an access permission.

In this embodiment of this application, the access permission in the entry includes a process ID PID of an application program that is allowed to access the feature node, or the access permission includes a name and a PID of an application program that is allowed to access the feature node.

Specifically, a permission management module may set the process ID of the application program that can access the feature node. When an application program needs to access the feature node, the permission management module may determine whether a process ID of the application program is a process ID that is allowed for access.

It may be understood that when the application program enables a process to execute a function, the kernel allocates a specific process ID to the application program, and the process ID of the process does not change before the process is killed. After the process is killed, the kernel may allocate the process ID to a next running process of the application program in the system. In this case, a hash management module may update the hash table and change an access permission of the feature node.

When the entry corresponding to the user handle identifier is found in the hash table, it may be further determined whether the current process is included in the entry, and the entry includes the access permission of the feature node.

Specifically, a process ID and a program name of the current process may be obtained, and a permission configuration attribute configured in manliest is accessed by using a function checkSelfPermission. The permission configuration attribute includes the process ID PID of the program that is allowed to access the feature node. After a permission configuration is obtained by using checkSelfPermission, it may be determined, based on the permission configuration, whether the current application has a permission to access a feature node indicated by the current ID.

When the permission configuration attribute prohibits the current process from accessing the feature node, the access exits, and 606 is performed: An identifier indicating an access failure is returned to the user program, for example, the identifier may be a negative number, and the negative value may indicate a cause for access rejection.

604. Determine whether a user is authorized.

Specifically, when a configuration file allows the current process to access the feature node, the current process may further continue to apply for an access permission. In this case, accessing an attribute of a node may be requested by using an interface function requestPermission. In this case, a dialog box indicating whether the current process is allowed to access the feature node is popped up in a user interface, to obtain authorization information of the user. In this case, blocking is required to wait for an authorization result. When the user rejects the access, the required function exits, and an identifier indicating an access failure is returned to the user program, for example, the identifier may be a negative number, and the negative value may indicate a cause for access rejection.

If the user allows access of the current program, 605 is performed.

605. Set the application program to be visible to the node.

In this case, the user program can access the feature node in the kernel, to complete a function requested by the user application.

606. Return an identifier.

When the procedure proceeds from 605 to 606, the user handle identifier in the hash table may be returned to the user program.

It should be noted that when the user program fails in the access, the returned identifier indicating an access failure is a negative value, and the negative value indicates a cause for access rejection. Therefore, the user returns different identifiers for exits in steps 602, 603, and 604.

Therefore, in this embodiment of this application, when the feature node is accessed by calling the interface function, a permission of a current process corresponding to the application program may be determined based on the access permission of the feature node corresponding to the interface function. In this way, transparent management of the process can be implemented, in other words, another application program that fails security authentication cannot access the feature node corresponding to the process, thereby ensuring secure access of the node.

In addition, according to the method for managing a node in this embodiment of this application, a development program can be simplified, and a to-be-accessed feature node can be statically configured. Specifically, a developer does not need to learn in detail a storage location of each feature node, a read/write permission required by each feature node, and the like. The process can run in the system, and the process has a specific permission. Therefore, according to the method, a feature node that needs to be accessed by the process may be directly set based on the permission of the process. In this way, not only a program accessing the node is simplified, but also security of the kernel node of the system is enhanced. The program can sense only a feature node with which the program needs to communicate, and cannot sense or access another node. Further, the developer does not need to learn an SE policy, and does not need to modify a file XXX.te, which improves program development efficiency.

Figure 7A:
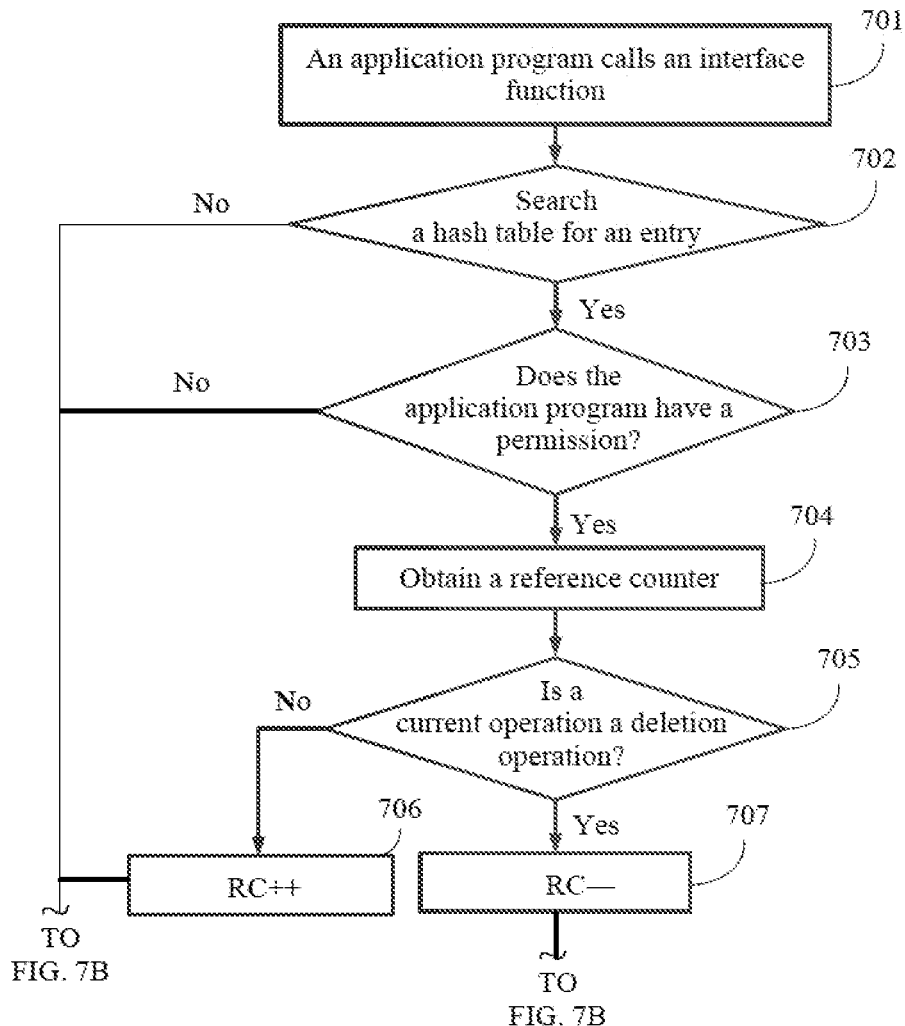
FIG. 7A and FIG. 7B are a schematic flowchart of a method for managing a node according to an embodiment of this application.
Figure 7B:
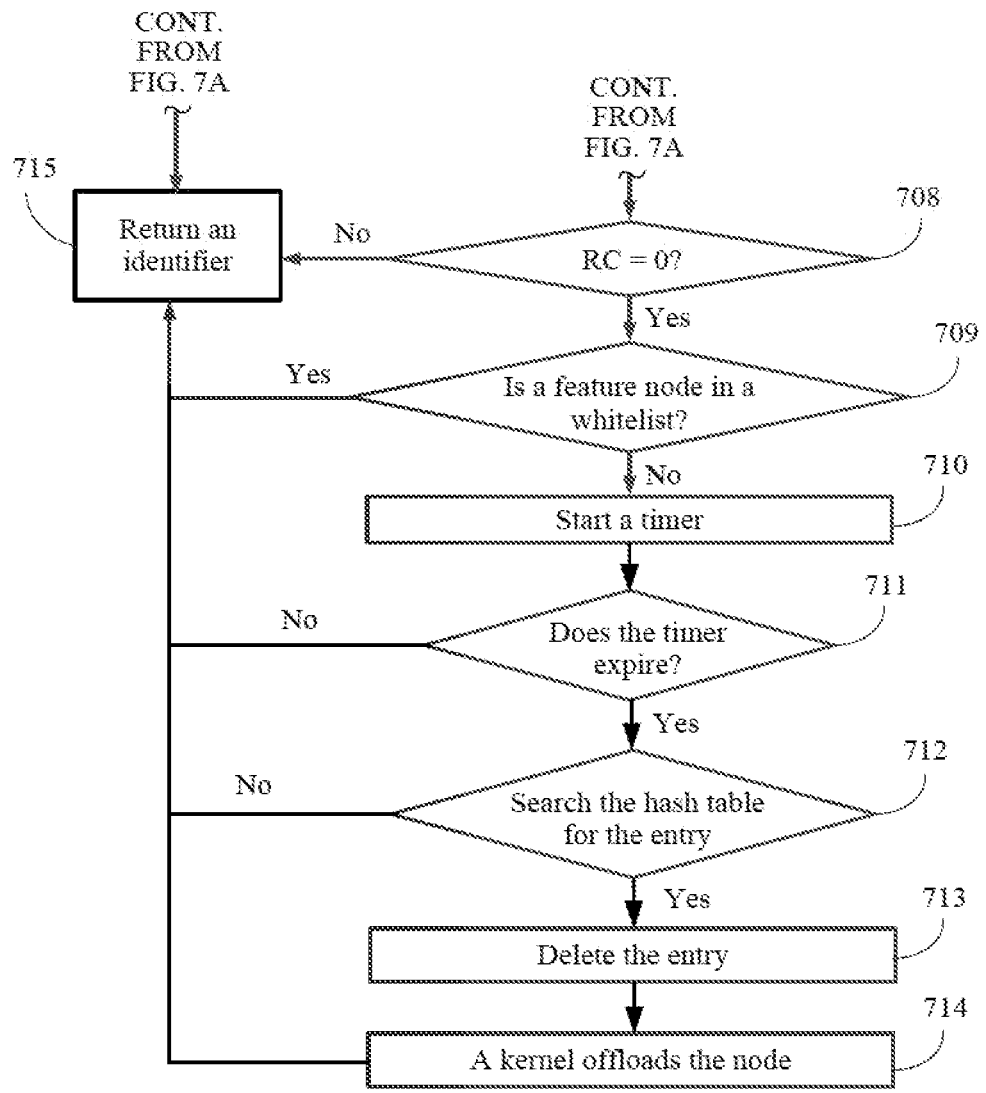

FIG. 7A and FIG. 7B are a schematic flowchart of a method for managing a node according to an embodiment of this application. It should be understood that FIG. 7A and FIG. 7B show steps or operations of the method for managing a node. However, these steps or operations are merely an example, and other operations or variants of the operations in FIG. 7A and FIG. 7B may be alternatively performed in this embodiment of this application. In addition, the steps in FIG. 7A and FIG. 7B may be performed based on a sequence different from a sequence presented in FIG. 7A and FIG. 7B, and it is possible that not all operations in FIG. 7A and FIG. 7B need to be performed.

701. An application program calls an interface function.

Herein, an interface management module 211 may receive a request that is initiated by the application program by calling the interface function, where the request is used to perform an open operation, a read operation, a write operation, or a close operation on a feature node in a kernel. For example, when the application program determines that the application program clues not access a feature node in a time period, the application program may call the interface function to perform the close operation on the feature node, so as to release the currently used feature node.

Specifically, for description of the interface function, refer to the description in 301. To avoid repetition, details are not described herein again.

702. Search a hash table for an entry.

Specifically, a node manager searches the local hash table to determine whether there is an entry of a feature node corresponding to the interface function. If the entry is found, it indicates that there is the feature node corresponding to the interface function, and 703 is performed. If the entry is not found, it indicates that there is no feature node corresponding to the interface function, and a corresponding identifier is directly returned, for example, the corresponding identifier may be a negative number, and the negative number may indicate a failure cause.

Specifically, for the entry, refer to the foregoing description. To avoid repetition, details are not described herein again.

703. Determine, based on a PID of the user program, whether the user program has an access permission.

Specifically, when the user program has the access permission, 704 is performed next. When the user program does not have the access permission, a corresponding identifier is directly returned, for example, the corresponding identifier may be a negative number, and the negative number may indicate a failure cause. Specifically, for details about how to determine the access permission of the user program based on the PID, refer to the description in 603. To avoid repetition, details are not described herein again.

704. Obtain a reference counter.

In this embodiment of this application, an entry of each feature node in the hash table may further include a reference counter of the feature node, and when the feature node is created, a count value RC of the reference counter may be set to a default value, for example, the default value may be 0 or another integer.

705. Determine whether a current operation is a deletion operation.

706. Increase the count value if a first request is used to perform a read operation or a write operation on the feature node. For example, the count value is increased by 1 (to be specific, RC++).

707. Decrease the count value if the first request is used to delete the feature node. For example, the count value is decreased by 1 (to be specific, RC—).

Specifically, when the application program performs the read operation or the write operation on the feature node, for example, when the application program calls the interface function to perform the open operation, the read operation, or the write operation, the count value of the counter is increased. When the application program deletes the feature node, for example, when the application program calls the interface function to perform the close operation, the count value of the counter is decreased.

708. Determine whether the count value is equal to a first preset value.

The first preset value may be preconfigured in the node manager, and in addition, the first preset value may be set according to experience, for example, may be greater than, equal to, or less than the default value of the count value. This is not limited in this embodiment of this application. In an example, the first preset value may be 0.

In a possible implementation, when the count value is equal to the first preset value (which may be preconfigured), the feature node may be directly offloaded.

In another possible implementation, when the count value is equal to the first preset value, the feature node may not be offloaded immediately, and whether the feature node needs to be offloaded is further determined. In this case, 709 may be performed next.

709. Determine whether the feature node is in a whitelist.

Specifically, when it is determined in 708 that the feature node is offloaded, whether the feature node is in the whitelist may be further determined. The whitelist includes a feature node that does not need to be deleted.

It may be understood that when the feature node is a hardware-related feature node, a large quantity of registers need to be initialized each time the feature node is loaded, which takes a large amount of time. Such a feature node may be in the whitelist. Alternatively, when memory space occupied by a process related to the feature node is not large, such a feature node may also be in the whitelist. Herein, the whitelist may be preconfigured in the node manager 216.

If the feature node is not in the whitelist, the feature node may be directly deleted. Alternatively, 710 may be performed next.

If the feature node is in the whitelist, the feature node is not deleted. In this case, a corresponding identifier is returned, for example, the corresponding identifier may be a negative number, and the negative number may indicate a failure cause.

710. Start a timer.

In this embodiment of this application, an entry of each feature node in the hash table may further include the timer.

711. Determine whether the timer expires.

Specifically, a second preset value may be preconfigured in the timer, and in addition, the second preset value may be set according to experience, and different second preset values may be configured for different feature nodes. This is not limited in this embodiment of this application.

When the timer is less than the second preset value after the timer is started, if a request for accessing the feature node that is initiated by the application program by calling the first interface function is received, for example, the request is to perform an operation such as open, read, or write on the feature node, the timer stops timing, and in this case, the feature node is not deleted. When the timer is equal to the second preset value, if the request for accessing the feature node that is initiated by the application program by calling the first interface function is not received, 712 is performed next.

712. Search the hash table for the entry.

Specifically, the feature node may be deleted when the procedure proceeds from 702 to 712. Therefore, the hash table may be searched for the entry again herein. If the entry is found, 713 is performed next; or if the entry is not found, 715 is performed: A corresponding, identifier is returned, for example, the corresponding identifier may be a negative number, and the negative number may indicate a failure cause.

713. Delete the entry

714. The kernel offloads the feature node.

Specifically, after updating the hash table, a hash management module may trigger a loading/offloading management module 213 to offload the feature node corresponding to the entry. Specifically, dynamic offloading may be performed by calling an rmmod function by the system.

715. Return an identifier.

For details, refer to the description in 606. To avoid repetition, details are not described herein again.

During feature node access in the kernel, a required feature node may be loaded to a memory by dynamically loading/offloading the feature node in this application, and when a feature node is not required, the feature node is removed from the memory. In this way, system resources such as a memory, a CPU, and I/O of the system occupied by a useless feature node can be reduced, so that the system can provide more resources for another running application program or service, thereby ensuring system performance.

For example, if an application program needs to access 100 feature nodes during running, when the application program exits the system, these feature nodes may not be used by another application program for a short time or a long time. In this case, these feature nodes may be offloaded. It is assumed that a system memory occupied by each feature node is 100 KB, if these feature nodes are not offloaded, the 100 feature nodes need to occupy a memory of 10 MB. In addition, these feature nodes may also monitor some event information, for example, a heartbeat, which wastes valuable system resources.

Figure 8:
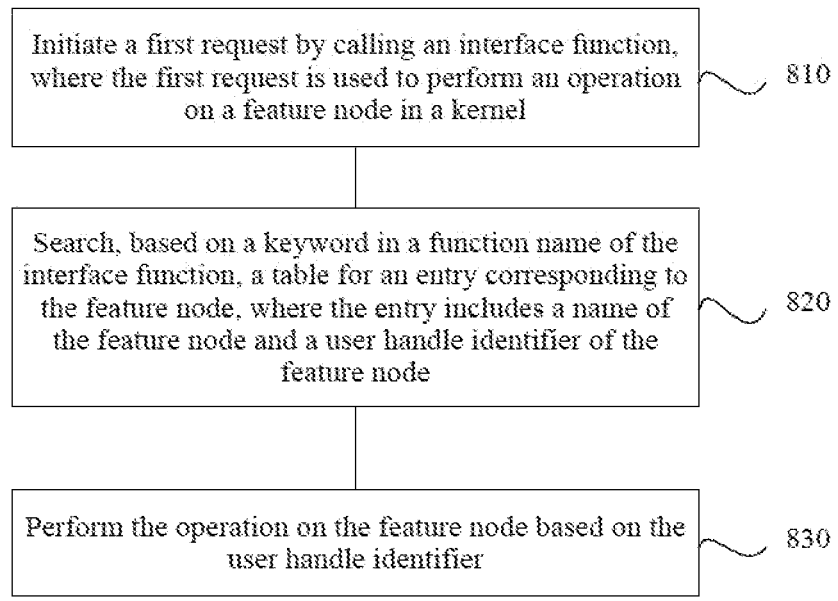
FIG. 8 is a schematic flowchart of a method for managing a node according to an embodiment of this application.

FIG. 8 is a schematic flowchart of a method for managing a node according to an embodiment of this application. The method for managing a node in this embodiment of this application may be implemented in an operating system that supports modular loading of a kernel function, and the operating system is, for example, an operating system based on a LINUX™ kernel (such as an ANDROID™ operating system). The operating system includes an application program, an adaptive node manager, and a kernel, where the adaptive node manager includes an interface management module and an encryption management module.

Specifically, for description of the application program, the adaptive node manager, and the kernel, refer to the foregoing description. To avoid repetition, details are not described herein again.

810. Initiate a first request by calling an interface function, where the first request is used to perform an operation on a feature node in a kernel.

Specifically, the interface management module receives the first request that is initiated by the application program by calling the interface function. Herein, the first request may be used to perform an open operation, a read operation, a write operation, and a close operation on the feature node in the kernel.

820. Search, based on a keyword in a function name of the interface function, a table used for node management for an entry corresponding to the feature node.

Specifically, the encryption management module searches, based on the keyword in the function name of the interface function, the table used for node management for the entry corresponding to the feature node, where the entry includes a node identifier of the feature node and a user handle identifier of the feature node, the node identifier of the feature node includes the keyword, there is a mapping relationship between the user handle identifier and a kernel handle identifier, and the kernel handle identifier represents an identity of the feature node running in the kernel.

For example, the node identifier of the feature node may be specifically a name of the feature node.

830. Perform the operation on the feature node based on the user handle identifier.

Specifically, the interface management module returns the user handle identifier to the user program, and the user program performs the operation on the feature node based on the user handle identifier.

Specifically, for 810, 820, and 830, refer to the foregoing description in FIG. 3, FIG. 6, or FIG. 7A and FIG. 7B. To avoid repetition, details are not described herein again.

Therefore, in this embodiment of this application, the first request that is used to perform the operation on the feature node is sent by calling the interface function, and the table used for node management (for example, a hash table) is searched for the entry of the feature node. The entry includes the user handle identifier that has a mapping relationship with the kernel handle identifier, and then the operation corresponding to the first request is performed on the feature node based on the user handle identifier. Therefore, in this embodiment of this application, the user handle identifier can be obtained by searching for the entry of the feature node, and the operation is performed on the feature node based on the user handle identifier, so that a coupling relationship between user space and the feature node in the kernel can be removed, and a program running in the user space performs a transparent operation on the feature node in the kernel, in other words, the program running in the user space can be prevented from directly accessing the feature node in the kernel space in this embodiment of this application, thereby improving system security.

Optionally, in this embodiment of this application, the method further includes: The node identifier of the feature node is determined.

Specifically, the adaptive node manager further includes a node creation management module and a loading/offloading management module. If the first request is not used to delete the feature node, before the encryption management module returns the user handle identifier to the user program, the node creation management module determines the name of the feature node.

The feature node is loaded based on the node identifier of the feature node.

Specifically, the loading/offloading module sends the name to the kernel, so that the kernel loads the feature node based on the name.

When the feature node is successfully loaded, the kernel handle identifier is obtained, and the user handle identifier is determined based on the kernel handle identifier, where the user handle identifier is a handle identifier in the user space to which the kernel handle identifier of the feature node is mapped.

Specifically, when determining that the kernel successfully loads the feature node, the loading/offloading module obtains the kernel handle identifier of the feature node, and determines the user handle identifier based on the kernel handle identifier.

The entry including the node identifier of the feature node and the user handle identifier of the feature node is added to the table. Specifically, the encryption management module adds the entry to the table.

In this case, when the encryption management module does not find the entry in the hash table, the node manager may send, to the kernel, a request for loading the feature node. When the kernel successfully loads the feature node, the node manager adds the entry corresponding to the kernel node to the hash table. Therefore, in this embodiment of this application, the node manager can dynamically create a kernel node according to an access requirement of the user program.

Optionally, in this embodiment of this application, before the feature node is loaded based on the node identifier of the feature node, the method further includes:

a storage path of the feature node is determined, where the storage path is used to indicate a path along which the feature node is loaded to a memory; and that the feature node is loaded based on the node identifier of the feature node includes:

the feature node is loaded based on the node identifier and the storage path of the feature node.

Specifically, the node creation management module may further determine the storage path of the feature node, the loading/offloading module sends the storage path to the kernel, and the kernel loads the feature node based on the storage path.

Optionally, in this embodiment of this application, before the feature node is loaded based on the node identifier of the feature node, the method further includes:

an access permission of the feature node is determined, where the access permission is used to indicate an application program that is allowed to access the feature node; and that the feature node is loaded based on the node identifier of the feature node includes:

the feature node is loaded based on the node identifier and the access permission of the feature node.

Specifically, the node creation management module may further determine the access permission of the feature node, the loading/offloading module sends the storage path to the kernel, and the kernel loads the feature node based on the access permission.

Specifically, for the steps performed by the node creation management module and the loading/offloading module, refer to the foregoing description in FIG. 3. To avoid repetition, details are not described herein again.

In this case, in this embodiment of this application, the feature node can be created in a proper, area based on a security level or an importance degree of the feature node, and the hash table can be updated. Therefore, in this embodiment of this application, only an application program related to the kernel node can access the kernel node, and another program in the user space cannot sense the feature node, thereby improving system security.

Optionally, in this embodiment of this application, the entry further includes the access permission of the feature node. The method further includes:

the application program pass the user handle identifier by using the interface function; and the access permission of the feature node is determined in the entry of the feature node based on the user handle identifier.

Specifically, the interface management module may further receive the user handle identifier that is passed by the application program by using the interface function.

The encryption management module determines the access permission of the feature node in the entry of the feature node based on the user handle identifier.

If the access permission allows the application program to access the feature node, the operation corresponding to the first request is performed on the feature node; or if the access permission does not allow the application program to access the feature node, the encryption management module rejects the first request.

Specifically, for the steps performed by the encryption management module and the encryption management module, refer to the foregoing description in FIG. 6. To avoid repetition, details are not described herein again.

Therefore, in this embodiment of this application, when the feature node is accessed by calling the interface function, a permission of a current process corresponding to the application program may be determined based on the access permission of the feature node corresponding to the interface function. In this way, transparent management of the process can be implemented, in other words, another application program that fails security authentication cannot access the feature node corresponding to the process, thereby ensuring secure access of the node.

In addition, according to the method for managing a node in this embodiment of this application, a development program can be simplified, and a to-be-accessed feature node can be statically configured. Specifically, a developer does not need to learn in detail a storage location of each feature node, a read/write permission required by each feature node, and the like. The process can run in the system, the process has a specific permission. Therefore, according to the method, a feature node that needs to be accessed by the process may be directly set based on the permission of the process. In this way, not only a program accessing the node is simplified, but also security of the kernel node of the system is enhanced. The program can sense only a feature node with which the program needs to communicate, and cannot sense or access another node. Further, the developer does not need to learn an SE policy, and does not need to modify a file XXX.te, which improves program development efficiency.

Optionally, in this embodiment of this application, the entry further includes a reference counter of the feature node. When the node creation management module creates the feature node, the encryption management module may set a count value of the reference counter to a default value.

The count value of the reference counter is increased if the first request is used to perform a read operation or a write operation on the feature node. For example, the count value is increased by 1.

The count value of the reference counter is decreased if the first request is used to delete the feature node. For example, the count value is decreased by 1, and when the count value is equal to a first preset value, the loading/offloading management module deletes the feature node.

Optionally, in this embodiment of this application, if the first request is used to delete the feature node, whether the feature node is in a whitelist is queried, where the whitelist includes a feature node that does not need to be deleted. Specifically, the loading/offloading management module may perform the query operation.

If the feature node is not in the whitelist and the count value is equal to the first preset value, the feature node is deleted. If the feature node is in the whitelist, the feature node is not deleted.

Optionally, the entry further includes a timer, and the timer is started when the count value is equal to the first preset value. When the timer is equal to a second preset value, if the application program does not initiate, by calling the first interface function, a second request that is used to perform an operation on the feature node, and the second request is not used to delete the feature node, the feature node is deleted.

When the timer is less than the second preset value, if the interface management module receives the second request that is initiated by the application program by calling the first interface function, the timer stops timing, and the feature node is not deleted.

Specifically, for the reference counter, the whitelist, and the timer, refer to the foregoing description in FIG. 7A and FIG. 7B. Specifically, for a process in which the loading/offloading management module dynamically offloads the feature node, refer to the foregoing description in FIG. 7A and FIG. 7B. To avoid repetition, details are not described herein again.

Therefore, during feature node access in the kernel, a required feature node may be loaded to the memory by dynamically loading/offloading the feature node in this application, and when a feature node is not required, the feature node is removed from the memory. In this way, system resources such as a memory, a CPU, and I/O of the system occupied by a useless feature node can be reduced, so that the system can provide more resources for another running application program or service, thereby ensuring system performance.

Figure 9:
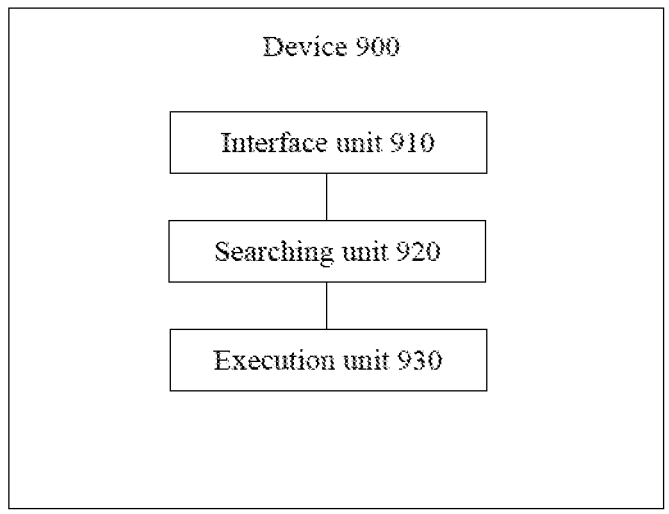
FIG. 9 is a schematic block diagram of a device for managing a node according to an embodiment of this application.

FIG. 9 is a schematic block diagram of a device 900 for managing a node according to an embodiment of this application. The device 900 may be a terminal device on which an operating system that supports modular loading of a kernel function is installed, for example, a tablet computer and a smartwatch. The device 900 includes an interface unit 910, a searching unit 920, an execution unit 930.

The interface unit 910 is configured to initiate a first request by calling an interface function, where the first request is used to perform an operation on a feature node in a kernel.

The searching unit 920 is configured to search, based on a keyword in a function name of the interface function, a table for an entry corresponding to the feature node, where the entry includes a node identifier of the feature node and a user handle identifier of the feature node, the node identifier of the feature node includes the keyword, there is a mapping relationship between the user handle identifier and a kernel handle identifier, and the kernel handle identifier represents an identity of the feature node running in the kernel.

The execution unit 930 is tin configured to perform the operation on the feature node based on the user handle identifier.

Therefore, in this embodiment of this application, the first request that is used to perform the operation on the feature node is sent by calling the interface function, and the table used for node management (for example, a hash table) is searched for the entry of the feature node. The entry includes the user handle identifier that has a mapping relationship with the kernel handle identifier, and then the operation corresponding to the first request is performed on the feature node based on the user handle identifier. Therefore, in this embodiment of this application, the user handle identifier can be obtained by searching for the entry of the feature node, and the operation is performed on the feature node based on the user handle identifier, so that a coupling relationship between user space and the feature node in the kernel can be removed, and a program running in the user space performs a transparent operation on the feature node in the kernel, in other words, the program running in the user space can be prevented from directly accessing the feature node in the kernel space in this embodiment of this application, thereby improving system security.

Optionally, the device further includes:

a determining unit, configured to determine the node identifier of the feature node;

a loading unit, configured to load the feature node based on the node identifier of the feature node; and an adding unit, configured to: when the feature node is successfully loaded, add the entry including the node identifier of the feature node and the user handle identifier of the feature node to the table, where the user handle identifier is a handle identifier in user space to which the kernel handle identifier of the feature node is mapped.

In this case, when the entry corresponding to the feature node is not found, a request for loading the feature node may be sent to the kernel. When the kernel successfully loads the feature node, the entry corresponding to the kernel node is added to the table used for node management. Therefore, in this embodiment of this application, the kernel node can be dynamically created according to an access requirement of the program in the user space.

Optionally, the determining unit is further configured to determine a storage path of the feature node, where the storage path is used to indicate a path along which the feature node is loaded to a memory.

The loading unit is specifically configured to:

load the feature node based on the node identifier and the storage path of the feature node determined by the determining unit.

Optionally, the determining unit is further configured to determine an access permission of the feature node, where the access permission is used to indicate an application program that is allowed to access the feature node.

The loading unit is specifically configured to:

load the feature node based on the node identifier and the access permission of the feature node determined by the determining unit.

In this case, in this embodiment of this application, the feature node can be created in a proper area based on a security level or an importance degree of the feature node, and the table used for node management is updated. Therefore, in this embodiment of this application, only an application program related to the kernel node can access the kernel node, and another program in the user space cannot sense the feature node, thereby improving system security.

Optionally, the entry further includes the access permission of the feature node. The interface unit 910 is further configured to pass the user handle identifier by using the interface function, and the determining unit is further configured to determine the access permission of the feature node in the entry of the feature node based on the user handle identifier.

If the access permission allows the application program to access the feature node, the operation corresponding to the first request is performed on the feature node.

If the access permission does not allow the application program to access the feature node, the first request is rejected.

Therefore, in this embodiment of this application, when the feature node is accessed by calling the interface function, a permission of a current process corresponding to the application program may be determined based on the access permission of the feature node corresponding to the interface function. In this way, transparent management of the process can be implemented, in other words, another application program that fails security authentication cannot access the feature node corresponding to the process, thereby ensuring secure access of the node.

In addition, according to the method for managing a node in this embodiment of this application, a development program can be simplified, and a to-be-accessed feature node can be statically configured. Specifically, a developer does not need to learn in detail a storage location of each feature node, a read/write permission required by each feature node, and the like. The process can run in the system, the process has a specific permission. Therefore, according to the method, a feature node that needs to be accessed by the process may be directly set based on the permission of the process. In this way, not only a program accessing the node is simplified, but also security of the kernel node of the system is enhanced. The program can see only a feature node with which the program needs to communicate, and cannot see or access another node. Further, the developer does not need to learn an SE policy, and does not need to modify a file XXX.te, which improves program development efficiency.

Optionally, the entry further includes a reference counter of the feature node, and when the feature node is created, a count value of the reference counter may be further set to a default value.

The count value of the reference counter is increased if the first request is used to perform a read operation or a write operation on the feature node. For example, the count value is increased by 1.

The device further includes a deletion unit. The count value of the reference counter is decreased if the first request is used to delete the feature node. For example, the count value is decreased by 1. When the count value is equal to a first preset value, the deletion unit is further configured to delete the feature node.

Optionally, if the first request is used to delete the feature node, whether the feature node is in a whitelist is queried, where the whitelist includes a feature node that does not need to be deleted. If the feature node is not in the whitelist and the count value is equal to the first preset value, the deletion unit is configured to delete the feature node. If the feature node is in the whitelist, the feature node is not deleted.

Optionally, the entry further includes a tinier, and the timer is started when the count value is equal to the first preset value.

When the timer is equal to a second preset value, if the application program does not initiate, by calling the first interface function, a second request that is used to perform an operation on the feature node, and the second request is not used to delete the feature node, the deletion unit is further configured to delete the feature node.

Therefore, during feature node access in the kernel, a required feature node may be loaded to the memory by dynamically loading/offloading the feature node in this application, and when a feature node is not required, the feature node is removed from the memory. In this way, system resources such as a memory, a CPU, and I/O of the system occupied by a useless feature node ran be reduced, so that the system can provide more resources for another running application program or service, thereby ensuring system performance.

It should be noted that the technical solutions of the embodiments of the present application may be applied to various terminal devices (also referred to as user equipment) on which an operating system that supports modular loading of a kernel function is installed, for example, a mobile phone, a wristband, a tablet computer, a notebook computer, an ultra-mobile personal computer (UMPC), a personal digital assistant (PDA) device, a handheld device with a wireless communication function, a computing device or another processing device connected to a wireless modem, a vehicle-mounted device, and a wearable device. The terminal device is not limited to a communications terminal.

Figure 10:
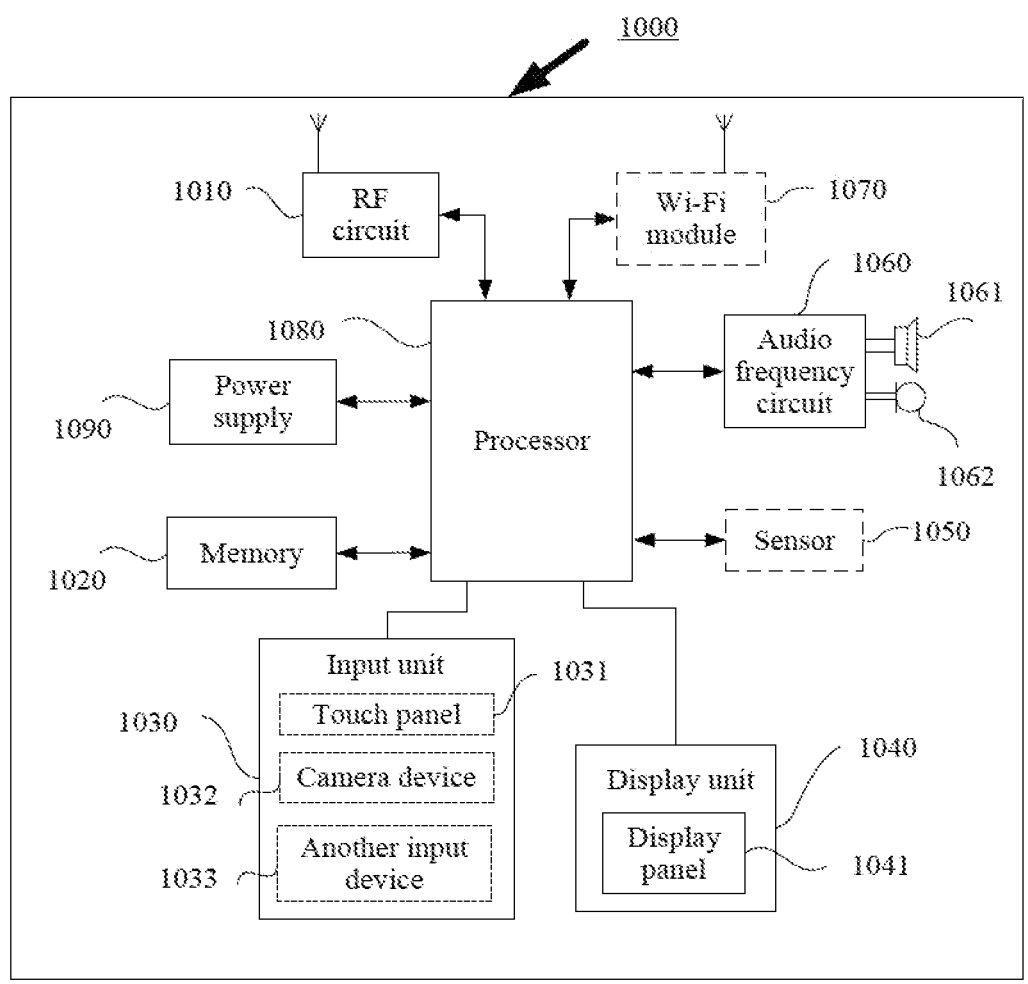
FIG. 10 is a schematic block diagram of a terminal device according to an embodiment of this application.

FIG. 10 is a schematic block diagram of a mobile phone 1000 according to an embodiment of this application. The mobile phone 1000 may include components such as a radio frequency (RF) circuit 1010, a memory 1020, an input unit 1030, a wireless fidelity (Wi-Fi) module 1070, a display unit 1040, a sensor 1050, an audio frequency circuit 1060, a processor 1080, and a power supply 1090.

A person skilled in the art may understand that a structure of the mobile phone shown in FIG. 10 is only an example instead of a limitation, and the mobile phone may include more or fewer components than those shown in the figure, or combine some components, or have different component arrangements.

The RF circuit 1010 may be configured to: receive and send a signal in an information receiving and sending process or a communication process; particularly, after receiving downlink information of a base station, send the downlink information to the processor 1080 for processing; and in addition, send uplink data of the mobile phone to the base station. Generally, the RF circuit includes but is not limited to an antenna, at least one amplifier, a transceiver, a coupler, a low noise amplifier (low noise amplifier, LNA), and a duplexer. In addition, the RF circuit 1010 may further communicate with a network and another device through wireless communication. The wireless communication may use any communications standard or protocol, including but not limited to global system for mobile communications (GSM), general packet radio service (GPRS), code division multiple access (CDMA), wideband code division multiple access (WCDMA), long term evolution (LTE), an email, and a short message service (SMS).

In this embodiment of this application, the interface unit 910, the searching unit 920, and the execution unit 930 may be implemented by the processor. Specifically, the memory 1020 is configured to store program code. The processor 1080 is configured to execute the pro ram code stored in the memory 1020, and when the program code is executed, the processor 1080 is configured to:

initiate a first request by calling an interface function, where the first request is used to perform an operation on a feature node in a kernel;

search, based on a keyword in a function name of the interface function, a table for an entry corresponding to the feature node, where the entry includes a node identifier of the feature node and a user handle identifier of the feature node, the node identifier of the feature node includes the keyword, there is a mapping relationship between the user handle identifier and a kernel handle identifier, and the kernel handle identifier represents an identity of the feature node running in the kernel, and perform the operation on the feature node based on the user handle identifier.

Therefore, in this embodiment of this application, the first request that is used to perform the operation on the feature node is sent by calling the interface function, and the table used for node management (for example, a hash table) is searched for the entry of the feature node. The entry includes the user handle identifier that has a mapping relationship with the kernel handle identifier, and then the operation corresponding to the first request is performed on the feature node based on the user handle identifier. Therefore, in this embodiment of this application, the user handle identifier can be obtained by searching for the entry of the feature node, and the operation is performed on the feature node based on the user handle identifier, so that a coupling relationship between user space and the feature node in the kernel can be removed, and a program running in the user space performs a transparent operation on the feature node in the kernel, in other words, the program running in the user space can be prevented from directly accessing the feature node in the kernel space in this embodiment of this application, thereby improving system security.

Optionally, in this embodiment of this application, the processor 1080 is further configured to: determine the node identifier of the feature node;

load the feature node based on the node identifier of the feature node; and when the feature node is successfully loaded, add the entry including the node identifier of the feature node and the user handle identifier of the feature node to the table, where the user handle identifier is a handle identifier in user space to which the kernel handle identifier of the feature node is mapped.

When the encryption management module does not find the entry in the hash table, the node manager may send, to the kernel, a request for loading the feature node. When the kernel successfully loads the feature node, the node manager adds the entry corresponding to the kernel node to the hash table. Therefore, in this embodiment of this application, the node manager can dynamically create a kernel node according, to an access requirement of the user program.

Optionally, in this embodiment of this application, the processor 1080 is further configured to: determine a storage path of the feature node, where the storage path is used to indicate a path along which the feature node is loaded to a memory, and load the feature node based on the node identifier and the storage path of the feature node.

Optionally, in this embodiment of this application, the processor 1080 is further configured to: determine an access permission of the feature node, where the access permission is used to indicate an application program that is allowed to access the feature node, and load the feature node based on the node identifier and the access permission of the feature node.

In this case, in this embodiment of this application, the feature node can be created in a proper area based on a security level or an importance degree of the feature node, and the hash table can be updated. Therefore, in this embodiment of this application, only an application program related to the kernel node can access the kernel node, and another program in the user space cannot sense the feature node, thereby improving system security.

Optionally, in this embodiment of this application, the entry further includes the access permission of the feature node. The processor 1080 is further configured to:

pass, by the application program, the user handle identifier by using the interface function; and determine the access permission of the feature node in the entry of the feature node based on the user handle identifier.

If the access permission allows the application program to access the feature node, the operation, corresponding to the first request is performed on the feature node; or if the access permission does not allow the application program to access the feature node, the encryption management module rejects the first request.

Therefore, in this embodiment of this application, when the feature node is accessed by calling the interface function, a permission of a current process corresponding to the application program may be determined based on the access permission of the feature node corresponding to the interface function. In this way, transparent management of the process can be implemented, in other words, another application program that fails security authentication cannot access the feature node corresponding to the process, thereby ensuring secure access of the node.

In addition, according to the method for managing a node in this embodiment of this application, a development program can be simplified, and a to-be-accessed feature node can be statically configured. Specifically, a developer does not need to learn in detail a storage location of each feature node, a read/write permission required by each feature node, and the like. The process can run in the system, the process has a specific permission. Therefore, according to the method, a feature node that needs to be accessed by the process may be directly set based on the permission of the process. In this way, not only a program accessing the node is simplified, but also security of the kernel node of the system is enhanced. The program can see only a feature node with which the program needs to communicate, and cannot see or access another node. Further, the developer does not need to learn an SE policy, and does not need to modify a file XXX.te, which improves program development efficiency.

Optionally, in this embodiment of this application, the entry further includes a reference counter of the feature node. The processor 1080 is further configured to: when the feature node is created, set, by the encryption management module, a count value of the reference counter to a default value The count value of the reference counter is increased if the first request is used to perform a read operation or a write operation on the feature node. For example, the count value is increased by 1.

The count value of the reference counter is decreased if the first request is used to delete the feature node. For example, the count value is decreased by 1, and when the count value is equal to a first preset value, the loading/offloading management module deletes the feature node.

Optionally, in this embodiment of this application, the processor 1080 is further configured to:

if the first request is used to delete the feature node, query whether the feature node is in a whitelist, where the whitelist includes a feature node that does not need to be deleted. Specifically, the processor 1080 may perform the query operation.

If the feature node is not in the whitelist and the count value is equal to the first preset value, the feature node is deleted. If the feature node is in the whitelist, the feature node is not deleted.

Optionally, the entry further includes a timer, and the timer is started when the count value is equal to the first preset value. The processor 1080 is further configured to:

when the timer is equal to a second preset value, if the application program does not initiate, by calling the first interface function, a second request that is used to perform an operation on the feature node, and the second request is not used to delete the feature node, delete the feature node.

When the timer is less than the second preset value, if the interface management module receives the second request that is initiated by the application program by calling the first interface function, the timer stops timing, and the feature node is not deleted.

Therefore, during feature node access in the kernel, a required feature node may be loaded to the memory by dynamically loading/offloading the feature node in this application, and when a feature node is not required, the feature node is removed from the memory. In this way, system resources such as a memory, a CPU, and I/O of the system occupied by a useless feature node can be reduced, so that the system can provide more resources for another running application program or service, thereby ensuring system performance.

The memory 1020 may mainly include a program storage area and a data storage area, where the program storage area may store an operating system, an application program required by at least one function (such as a voice playing function and an image playing function), and the like, and the data storage area may store data (such as audio data and a phone hook) created according to usage of the mobile phone, and the like. In addition, the memory 1020 may include a high-speed random access memory, and may further include a nonvolatile memory, for example, at least one magnetic disk storage device, a flash storage device, or another volatile solid-state storage device.

In this embodiment of this application, the processor may be an integrated circuit chip, and has a signal processing capability. In an implementation process, steps in the foregoing method embodiments can be implemented by using a hardware integrated logical circuit in the processor, or by using instructions in a form of software. The foregoing processor may be a central processing unit (CPU), the processor may further be another general purpose processor, a digital signal processor (DSP), an application specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any processor or the like. The steps of the methods disclosed with reference to the embodiments of this application may be directly performed by a hardware decoding processor, or may be performed by using a combination of hardware and a software unit in the decoding processor. The software unit may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DRRAM). It should be noted that the memory of the systems and methods described in this specification includes but is not limited to these and any memory of another proper type.

A network device or a terminal device in an apparatus embodiment fully corresponds to a network device or a terminal device in a method embodiment. A corresponding module performs a corresponding step. For example, a sending module or a transmitter performs a sending step in the method embodiment, and a receiving module or a receiver performs a receiving step in the method embodiment. Steps other than the sending and receiving steps may be performed by a processing module or a processor. For a function of a specific module, refer to a corresponding method embodiment. Details are not described herein again.

In an implementation process, steps in the foregoing methods can be implemented by using a hardware integrated logical circuit in the processor 1080, or by using instructions in a form of software. The steps of the methods disclosed with reference to the embodiments of this application may be directly performed by a hardware processor, or may be performed by using a combination of hardware and a software module in the processor. The software module may be located in a mature storage medium in the art, such as a random access memory, a flash memory, a read-only memory, a programmable read-only memory, an electrically erasable programmable memory, a register, or the like. The storage medium is located in the memory 1020, and the processor 1080 reads information in the memory 1020 and completes the steps in the foregoing methods in combination with hardware of the processor. To avoid repetition, details are not described herein again.

The input unit 1030 may be configured to: receive entered digital or character information, and generate a key signal related to user settings and function control of the terminal device 1000. Specifically, the input unit 1030 may include a touch panel 1031, a camera device 1032, and another input device 1033. The camera device 1032 may perform photographing to obtain a required image, so as to transmit the image to the processor 1080 for processing, and finally the image is present to a user through, a display panel 1041. The touch panel 1031, also referred to as a touchscreen, may collect a touch operation of the user on or near the touch panel 1031 (such as an operation of the user on or near the touch panel 1031 performed by using any suitable object or accessory such as a finger or a stylus), and drive a corresponding connection apparatus based on a preset program.

Optionally, the touch panel 1031 may include two parts: a touch detection apparatus and a touch controller. The touch detection apparatus detects a touch location of the user, detects a signal brought by a touch operation, and transmits the signal to the touch controller. The touch controller receives touch information from the touch detection apparatus, converts the touch information into touch point coordinates, and sends the touch point coordinates to the processor 1080. In addition, the touch controller can receive and execute a command sent by the processor 1080. In addition, the touch panel 1031 may be implemented in a plurality of types such as a resistive type, a capacitive type, an infrared type, and a surface acoustic wave type. In addition to the touch panel 1031 and the camera device 1032, the input unit 1030 may further include another input device 1032. Specifically, the another input device 1032 may include, but is not limited to, one or more of a physical keyboard, a functional button (such as a sound volume control button or a power button), a trackball, a mouse, and a joystick.

The display unit 1040 may be configured to display information that is input by the user or information provided for the user and various menus of the mobile phone. The display unit 1040 may include a display panel 1041. Optionally, the display panel 1041 may be configured by using a liquid crystal display (LCD), an organic light-emitting diode (OLED), or the like. Further, the touch panel 1031 may cover the display panel 1041. When detecting the touch operation on or near the touch panel 1031, the touch panel 1031 transmits the touch operation to the processor 1080 to determine a type of a touch event, and then the processor 1080 provides corresponding visual output on the display panel 1041 based on the type of the touch event.

The external display panel 1041 of visual output that can be identified by human eyes may be used as a display device in this embodiment of the present application, and is configured to display text information or image information. In FIG. 10, the touch panel 1031 and the display panel 1041 are used as two independent components to implement input and output functions of the mobile phone. However, in some embodiments, the touch panel 1031 and the display panel 1041 may be integrated to implement the input and output functions of the mobile phone.

In addition, the terminal device 1000 may further include at least one sensor 1050, such as an attitude sensor, a distance sensor, and other sensors.

Specifically, the attitude sensor may also be referred to as a motion sensor. In addition, as the motion sensor, an angular velocity sensor (also referred to as a gyroscope) may be enumerated. When the gyroscope is disposed in the mobile phone, the gyroscope is configured to measure a rotational angular velocity of the mobile phone in a motion state in a case of deflection or tilt, so that the gyroscope can accurately analyze and determine an actual action of a user who uses the mobile phone, and a corresponding operation can be performed on the mobile phone, for example, a motion sense, a shake (shaking the mobile phone to implement some functions), controlling a visual angle in a game by panning/rotating/moving the mobile phone, or implementing inertial navigation based on a motion status of an object when a global positioning system (Global Positioning System, "GPS" for short) has no signal (for example, in a tunnel).

In addition, in this embodiment of the present application, another sensor such as a barometer, a hygrometer, a thermometer, or an infrared sensor may be further configured as the sensors 1050. Details are not described herein.

An optical sensor may include an ambient light sensor and a proximity sensor. The ambient light sensor may adjust brightness of the display panel 1041 based on light and shade of ambient light, and the proximity sensor may close the display panel 1041 and/or backlight when the mobile phone moves to an ear.

The audio frequency circuit 1060, a loudspeaker 1061, and a microphone 1062 may provide an audio interface between the user and the mobile phone. The audio frequency circuit 1060 may convert received audio data into an electrical signal, and then transmit the electrical signal to the loudspeaker 1061, and the loudspeaker 1061 converts the electrical signal into a sound signal for output. In addition, the microphone 1062 converts a collected sound signal into an electrical signal. The audio frequency circuit 1060 receives the electrical signal, converts the electrical signal into audio data, and then outputs the audio data to the processor 1080 for processing. After the processing, the processor 880 sends the audio data to, for example, another mobile phone by using the RF circuit 1010, or outputs the audio data to the memory 1020 for further processing.

Wi-Fi belongs to a short-range wireless transmission technology. The mobile phone may help, by using the Wi-Fi module 1070, the user receive and send an email, browse a web page, access streaming media, and the like. The Wi-Fi module 1070 provides wireless broadband Internet access for the user. Although FIG. 10 shows the Wi-Fi module 1070, it may be understood that the Wi-Fi module 1070 is not a mandatory part of the terminal device 1000, and may be omitted based on a requirement without changing the essence of the present application.

As a control center of the mobile phone, the processor 1080 connects various parts of the entire mobile phone by using various interfaces and lines, and performs various functions of the mobile phone and processes data by running or executing the software program and/or the module stored in the memory 1020 and by invoking data stored in the memory 1020, to perform overall monitoring on the mobile phone. Optionally, the processor 1080 may include one or more processing units. Preferably, an application processor and a modem processor may be integrated into the processor 1080. The application processor mainly processes an operating system, a user interface, an application program, and the like. The modem processor mainly processes wireless communication.

It may be understood that, alternatively, the modem processor may not be integrated into the processor 1080.

The terminal device 1000 further includes the power supply 1090 that supplies power for each part.

Preferably, the power supply 1090 may be logically connected to the processor 1080 by using a power supply management system, to implement functions such as charging management, discharging management, and power consumption management by using the power supply management system. Although not shown, the terminal device 1000 may further include a BLUETOOTH™ module, a headset jack, and the like. Details are not described herein.

The device 900 shown in FIG. 9 or the terminal device 1000 shown in FIG. 10 can implement the processes corresponding to the foregoing method embodiments shown in FIG. 3 to FIG. 8. Specifically, for the device 900 or the terminal device 1000, refer to the foregoing description in FIG. 3 to FIG. 8. To avoid repetition, details are not described herein again.

An embodiment of this application further provides a computer readable medium, configured to store a computer program. The computer program includes an instruction executed by the device for managing a node in the implementations in FIG. 3 and FIG. 8.

A person of ordinary skill the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

The foregoing descriptions are merely exemplary embodiments of this application, but are not intended to limit the scope of protection of this application. Any variation or replacement readily figured out by a person skilled in the art within the technical scope disclosed in this application shall hill within the scope of protection of this application. Therefore, the scope of protection of this application shall be subject to the scope of protection of the claims.

What is claimed is:

1. A method for managing a feature node in a kernel, comprising:
   initiating a first request by calling an interface function, wherein the first request is used to perform an operation on the feature node in the kernel;
   searching, based on a keyword in a function name of the interface function, a table for an entry corresponding to the feature node, wherein the entry comprises a node identifier of the feature node and a user handle identifier of the feature node, the node identifier of the feature node comprises the keyword, the user handle identifier is at least one of a user program identifier obtained by increasing a kernel handle identifier by an offset value and a virtual identifier of the feature node that uniquely corresponds to the kernel handle identifier using a hash table, and the kernel handle identifier identifies the feature node running in the kernel; and
   performing the operation on the feature node based on the user handle identifier.

2. The method according to claim 1, wherein the method further comprises:
   determining the node identifier of the feature node;
   loading the feature node in the kernel based on the node identifier of the feature node; and
   when the feature node is successfully loaded, adding the entry comprising the node identifier of the feature node and the user handle identifier of the feature node to the table, wherein the user handle identifier is a handle identifier in a user space.

3. The method according to claim 2, wherein the loading of the feature node in the kernel based on the node identifier of the feature node comprises:
loading the feature node based on the node identifier and a storage path of the feature node, wherein the storage path indicates a path along which the feature node is loaded into the kernel.

4. The method according to claim 2, wherein the loading of the feature node in the kernel based on the node identifier of the feature node comprises:
loading the feature node based on the node identifier and an access permission of the feature node, wherein the access permission indicates whether an application program is allowed to access the feature node.

5. The method according to claim 4, wherein the entry further comprises the access permission, and the method further comprises:
passing, by the application program, the user handle identifier by using the interface function; and
determining the access permission of the feature node in the entry of the feature node based on the user handle identifier.

6. The method according to claim 1, wherein the entry further comprises a reference counter of the feature node, and the method further comprises:
increasing a count value of the reference counter, with the first request being at least one of a read operation and a write operation on the feature node; or
decreasing a count value of the reference counter and deleting the feature node, with the count value being equal to a first preset value and the first request being to delete the feature node.

7. The method according to claim 6, further comprising:
querying whether the feature node is in a whitelist for non-deletion, with the first request being to delete the feature node; and
deleting the feature node, with the querying determining that the feature node is not in the whitelist and the count value is equal to the first preset value.

8. The method according to claim 6, wherein the entry further comprises a timer, and the deleting of the feature node comprises:
starting the timer, with the count value being equal to the first preset value; and
deleting the feature node, with the timer being equal to a second preset value and a second request that is used to perform an operation on the feature node being not to delete the feature node, the second request occurring after the application program does not initiate and the first interface function is called.

9. The method according to claim 6, further comprising:
querying whether the feature node is in a whitelist for non-deletion, with the first request being to delete the feature node; and
skipping deleting the feature node, with the querying determining that the feature node is in the whitelist.

10. A device for managing a feature node in a kernel, comprising:
a memory, configured to store a computer program; and
a processor connected to the memory and being configured to execute the computer program stored in the memory to perform:
initiating a first request by calling an interface function, wherein the first request is used to perform an operation on the feature node in the kernel;
searching, based on a keyword in a function name of the interface function, a table for an entry corresponding to the feature node, wherein the entry comprises a node identifier of the feature node and a user handle identifier of the feature node, the node identifier of the feature node comprises the keyword, the user handle identifier is at least one of a user program identifier obtained by increasing a kernel handle identifier by an offset value and a virtual identifier of the feature node that uniquely corresponds to the kernel handle identifier using a hash table, and the kernel handle identifier identifies the feature node running in the kernel; and
performing the operation on the feature node based on the user handle identifier.

11. The device according to claim 10, wherein the processor is further configured to perform:
determining the node identifier of the feature node;
loading the feature node in the kernel based on the node identifier of the feature node; and
when the feature node is successfully loaded, adding the entry comprising the node identifier of the feature node and the user handle identifier of the feature node to the table, wherein the user handle identifier is a handle identifier in a user space.

12. The device according to claim 11, wherein the processor is further configured to perform:
loading the feature node based on the node identifier and a storage path of the feature node, wherein the storage path indicates a path along which the feature node is loaded into the kernel.

13. The device according to claim 11, wherein the processor is further configured to perform:
loading the feature node based on the node identifier and an access permission of the feature node, wherein the access permission indicates whether an application program that is allowed to access the feature node.

14. The device according to claim 13, wherein the processor is further configured to perform:
passing, by the application program, the user handle identifier by using the interface function; and
determining the access permission of the feature node in the entry of the feature node based on the user handle identifier.

15. The device according to claim 10, wherein the entry further comprises a reference counter of the feature node and the processor is further configured to perform:
increasing a count value of the reference counter, with the first request being at least one of a read operation and a write operation on the feature node; or
decreasing a count value of the reference counter and deleting the feature node, with the count value being equal to a first preset value and the first request being to delete the feature node.

16. The device according to claim 15, wherein the processor is further configured to perform:
querying whether the feature node is in a whitelist for non-deletion, with the first request being to delete the feature node; and
deleting the feature node, with the querying determining that the feature node is not in the whitelist and the count value is equal to the first preset value.

17. The device according to claim 15, wherein the entry further comprises a timer, and the processor is further configured to perform:

starting the timer, with the count value being equal to the first preset value; and deleting the feature node, with the timer being equal to a second preset value and a second request that is used to perform an operation on the feature node being not to delete the feature node, the second request occurring after the application program does not initiate and the first interface function is called.

18. The device according to claim 15, wherein the processor is further configured to perform:

querying whether the feature node is in a whitelist for non-deletion, with the first request being to delete the feature node; and skipping deleting the feature node, with the querying determining that the feature node is in the whitelist.

19. A non-transitory computer readable storage medium, having stored therein a program that causes a computer to execute a process comprising:

initiating a first request by calling an interface function, wherein the first request is used to perform an operation on a feature node in a kernel;

searching, based on a keyword in a function name of the interface function, a table for an entry corresponding to the feature node, wherein the entry comprises a node identifier of the feature node and a user handle identifier of the feature node, the node identifier of the feature node comprises the keyword, the user handle identifier is at least one of a user program identifier obtained by increasing a kernel handle identifier by an offset value and a virtual identifier of the feature node that uniquely corresponds to the kernel handle identifier using a hash table, and the kernel handle identifier identifies the feature node running in the kernel; and performing the operation on the feature node based on the user handle identifier.

\* \* \* \* \*